(12) United States Patent
Gong et al.

(10) Patent No.: US 12,562,946 B2
(45) Date of Patent: *Feb. 24, 2026

(54) CYCLIC SHIFT DIVERSITY SEQUENCE-BASED COMMUNICATION METHOD, APPARATUS, AND SYSTEM

(71) Applicant: HUAWEI TECHNOLOGIES CO., LTD., Guangdong (CN)

(72) Inventors: Bo Gong, Shenzhen (CN); Chenchen Liu, Shenzhen (CN); Mengshi Hu, Shenzhen (CN); Jian Yu, Shenzhen (CN); Ming Gan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 212 days.

This patent is subject to a terminal disclaimer.

(21) Appl. No.: 18/340,182

(22) Filed: Jun. 23, 2023

(65) Prior Publication Data

US 2023/0336389 A1     Oct. 19, 2023

Related U.S. Application Data

(63) Continuation of application No. PCT/CN2021/118187, filed on Sep. 14, 2021.

(30) Foreign Application Priority Data

Dec. 24, 2020     (CN) .......................... 202011573363.6

(51) Int. Cl.
H04L 27/26          (2006.01)

(52) U.S. Cl.
CPC ................................ *H04L 27/2605* (2013.01)

(58) Field of Classification Search
CPC ............. H04W 72/0453; H04W 84/12; H04W 72/542; H04L 27/2603; H04L 27/2602; H04L 27/2607; H04L 27/2613; H04L 1/06
See application file for complete search history.

(56) References Cited

U.S. PATENT DOCUMENTS

2020/0177425 A1*  6/2020  Chen ................... H04L 27/2602
2021/0204299 A1*  7/2021  Yun ..................... H04W 72/542

FOREIGN PATENT DOCUMENTS

CN        102377468 A     3/2012
CN        111817764 A     10/2020
WO        2020085650 A1   4/2020

OTHER PUBLICATIONS

Chinese Office Action issued in CN Application No. 202011573363.6 dated Aug. 28, 2024.

(Continued)

*Primary Examiner* — Mahran Y Abu Roumi

(57)          ABSTRACT

The embodiments of this application provides a cyclic shift diversity sequence-based communication method. In the method, a first communication apparatus generates a physical layer protocol data unit (PPDU) and sends the PPDU to a second communication apparatus. The PPDU includes a short training field (STF), a long training field (LTF), and a data field that are determined based on a cyclic shift diversity (CSD) sequence. After receiving the PPDU from the first communication apparatus, the second communication apparatus performs processing based on the PPDU. The CSD sequence includes L elements. L is a maximum number of spatial streams supported by the first communication apparatus and the second communication apparatus. The maximum number of spatial streams is greater than or equal to 16.

20 Claims, 9 Drawing Sheets

HT PPDU

(56) References Cited

OTHER PUBLICATIONS

IEEE Std 802.11n-2009, IEEE Standard for Information technology Telecommunications and information exchange between systems Local and metropolitan area networks Specific requirements Part 11: Wireless LAN Medium Access Control (MAC) and Physical Layer (PHY) Specifications Amendment 5: Enhancements for Higher Throughput, Sep. 11, 2009, total 536 pages.

IEEE Std 802.11ac-2013, IEEE Standard for Information technology Telecommunications and information exchange between systems Local and metropolitan area networks Specific requirements Part 11: Wireless LAN Medium Access Control (MAC) and Physical Layer (PHY) Specifications Amendment 4: Enhancements for Very High Throughput for Operation in Bands below 6 GHZ, Dec. 11, 2013, total 425 pages.

IEEE P802.11ax/D8.0, Draft Standard for Information technology Telecommunications and information exchange between systems Local and metropolitan area networks Specific requirements Part 11: Wireless LAN Medium Access Control (MAC) and Physical Layer (PHY) Specifications Amendment 1: Enhancements for High Efficiency WLAN, Oct. 2020, total 820 pages.

IEEE P802.11be/D0. 1, Draft Standard for Information technology Telecommunications and information exchange between systems Local and metropolitan area networks Specific requirements Part 11: Wireless LAN Medium Access Control (MAC) and Physical Layer (PHY) Specifications Amendment 8: Enhancements for extremely high throughput (EHT), Sep. 2020, total 299 pages.

IEEE Std 802.Nov. 2016, IEEE Standard for Information technology Telecommunications and information exchange between systems Local and metropolitan area networks Specific requirements Part 11: Wireless LAN Medium Access Control (MAC) and Physical Layer (PHY) Specifications, Dec. 7, 2016, total 3534 pages.

International Search Report and Written Opinion issued in PCT Application No. PCT/CN2021/118187 dated Dec. 17, 2021.

* cited by examiner

S901: Determine a discrete time set

S902: Determine a first initial set and a second initial set, where the first initial set and the second initial set form the discrete time set S903: Perform selection for X times based on the first initial set and the second initial set, to obtain a CSD sequence

CYCLIC SHIFT DIVERSITY SEQUENCE-BASED COMMUNICATION METHOD, APPARATUS, AND SYSTEM

CROSS-REFERENCE TO RELATED APPLICATION

This application is a continuation of International Application No. PCT/CN2021/118187, filed on Sep. 14, 2021, which claims priority to Chinese Patent Application No. 202011573363.6, filed on Dec. 24, 2020. The disclosures of the aforementioned applications are hereby incorporated by reference in their entireties.

TECHNICAL FIELD

This application relates to the field of communication technologies, and in particular, to a cyclic shift diversity sequence-based communication method, an apparatus, and a system.

BACKGROUND

A multi-input multi-output (multi-input multi-output, MIMO) technology is a major breakthrough in a smart antenna technology in the field of wireless mobile communications. The technology can multiply a capacity and spectrum utilization of a communication system by using spatial multiplexing and spatial diversity, without an increase in a bandwidth. In a MIMO system, a transmit end and a receive end respectively use a plurality of transmit antennas and a plurality of receive antennas, and the plurality of transmit antennas are allowed to simultaneously send a plurality of spatial streams, or the plurality of receive antennas are allowed to simultaneously receive the plurality of spatial streams.

To greatly improve a service transmission rate of a wireless local access network (wireless local access network, WLAN) system, the institute of electrical and electronics engineers (institute of electrical and electronics engineers, IEEE) has introduced the MIMO technology on the basis of an orthogonal frequency division multiplexing (orthogonal frequency division multiplexing, OFDM) technology.

The IEEE has introduced the MIMO technology in a WLAN from the 802.11n protocol. The MIMO technology supports a maximum of four spatial streams. As communication requirements increase, a maximum number of spatial streams is expanded from 4 to 8 in the 802.11ac protocol, and the maximum number of spatial streams in the 802.11ac protocol is inherited in the 802.11ax protocol.

SUMMARY

This application provides a cyclic shift diversity sequence-based communication method, an apparatus, and a system, to improve a system capacity and spectral efficiency, and further reduce an automatic gain control (automatic gain control, AGC) gain setting error.

According to a first aspect, this application provides a cyclic shift diversity sequence-based communication method. The method may be performed by a first communication apparatus, or may be performed by a component of the first communication apparatus, for example, a processor, a chip, or a chip system of the first communication apparatus. In this application, an example in which the first communication apparatus performs the method is used for description. The method includes: The first communication apparatus generates a physical layer protocol data unit PPDU. The PPDU includes a short training field STF, a long training field LTF, and a data field. The STF, the LTF, and the data field are determined based on a cyclic shift diversity CSD sequence. The CSD sequence includes L elements. L is a maximum number of spatial streams supported by the first communication apparatus. The maximum number of spatial streams is greater than or equal to 16. The first communication apparatus sends the PPDU to a second communication apparatus.

According to this solution, the maximum number of spatial streams may be expanded from 8 to 16. Therefore, this solution is applicable to a communication scenario with a high communication requirement and a large amount of data. This improves a system capacity and spectral efficiency. In addition, compared with expanding the maximum number of spatial streams to more than 16, limiting the maximum number of spatial streams to 16 can reduce a requirement on a number of antennas of an access point or a non-access point station, thereby reducing implementation complexity of the access point or the non-access point station. Further, if a problem of implementation complexity of the access point or the non-access point station has been resolved, for example, when the access point or the non-access point can support a larger number of antennas, and a communication requirement increases, the maximum number of spatial streams can be expanded to more than 16, for example, 32 or 64, to further improve the system capacity and the spectral efficiency. Based on a maximum number of expanded spatial streams in this application, a corresponding CSD sequence is further used in the STF, the LTF, and the data field in this application, to reduce a correlation between STFs on the spatial streams, and correspondingly reduce an AGC gain setting error when AGC is performed based on power of the STF.

In some possible designs, that the first communication apparatus sends the PPDU to a second communication apparatus includes: The first communication apparatus sends the PPDU to the second communication apparatus by using K spatial streams. K is a positive integer less than or equal to L.

In other words, the first communication apparatus may send the PPDU by using less than L spatial streams. In an actual application, due to complex and diversified channel environments, a larger number of spatial streams do not indicate higher spectral efficiency or transmission performance. Therefore, based on this possible implementation, when sending the PPDU, the first communication apparatus may determine, based on an actual channel condition, to send the PPDU by using less than L spatial streams, so as to maximize the spectral efficiency as much as possible. Certainly, when a channel condition is good, K may be equal to L, to be specific, the first communication apparatus sends the PPDU by using the L spatial streams, to maximize the spectral efficiency.

In some possible designs, the STF, the LTF, and the data field are determined based on the first K elements in the CSD sequence. It may be understood that the first K elements in the CSD sequence are cyclic shift values respectively corresponding to K spatial streams. Based on the possible design, when the PPDU is sent by using the K spatial streams, the STF, the LTF, and the data field are determined based on the first K elements in the CSD sequence, to properly perform cyclic shift on each spatial stream, and correspondingly reduce a correlation between STFs on the spatial streams.

In some possible designs, L is equal to 16. The first eight elements in the CSD sequence are 0, −400, −200, −600, −350, −650, −100, and −750. The last eight elements in the CSD sequence include −550, −250, −500, −150, −700, −50, −450, and −300.

Based on this possible design, the first four elements in the CSD sequence provided in this application are CSD values of 1 to 4 streams in the 802.11n protocol, and the first eight elements are CSD values of 1 to 8 streams in the 802.11ac protocol or the 802.11ax protocol. In other words, the CSD sequence is compatible with the 802.11n protocol, the 802.11ac protocol, or the 802.11ax protocol. This facilitates smooth evolution of a system. In addition, when the CSD sequence is compatible with the 802.11n protocol and an 802.11n data packet needs to be sent, or when the CSD sequence is compatible with the 802.11ac/802.11ax protocol and an 802.11ac/802.11ax data packet needs to be sent, cyclic shift may be directly performed based on the CSD sequence provided in this application. This can reduce implementation complexity, compared with cyclic shift separately performed on a corresponding standard data packet based on a plurality of standard CSD sequences.

In some possible designs, L is equal to 16. The first element in the CSD sequence is 0. The last 15 elements in the CSD sequence include −550, −225, −675, −325, −100, −450, −275, −500, −50, −725, −600, −375, −150, −575, and −475.

Based on this possible design, this application provides a CSD sequence that is incompatible with the 802.11ac protocol or the 802.11ax protocol. First criterion values of a correlation matrix respectively corresponding to the first P (P=2, 3, . . . , 7) elements in the CSD sequence are obtained through calculation, and are less than first criterion values of a correlation matrix respectively corresponding to the first P elements in the CSD sequence in the 802.11ac protocol or the 802.11ax protocol. Similarly, second criterion values of the correlation matrix respectively corresponding to the first P elements in the CSD sequence are less than second criterion values of the correlation matrix respectively corresponding to the first P elements in the CSD sequence in the 802.11ac protocol or the 802.11ax protocol. In other words, when there are two to seven spatial streams, the CSD sequence that is provided in this application and that is incompatible with the 802.11ac protocol or the 802.11ax protocol can further reduce a correlation between STFs on the spatial streams.

According to a second aspect, this application provides a cyclic shift diversity sequence-based communication method. The method may be performed by a second communication apparatus, or may be performed by a component of the second communication apparatus, for example, a processor, a chip, or a chip system of the second communication apparatus. In this application, an example in which the second communication apparatus performs the method is used for description. The method includes: A second communication apparatus receives a physical layer protocol data unit PPDU from a first communication apparatus. The PPDU includes a short training field STF, a long training field LTF, and a data field. The STF, the LTF, and the data field are determined based on a cyclic shift diversity CSD sequence. The CSD sequence includes L elements. L is a maximum number of spatial streams supported by the first communication apparatus. The maximum number of spatial streams is greater than or equal to 16. The second communication apparatus performs processing based on the PPDU.

For technical effect brought by the second aspect, refer to technical effect brought by the first aspect. Details are not described herein again.

In some possible designs, that a second communication apparatus receives a PPDU from a first communication apparatus includes: The second communication apparatus receives the PPDU from the first communication apparatus by using K spatial streams.

In some possible designs, the STF, the LTF, and the data field are determined based on the first K elements in the CSD sequence.

In some possible designs, L is equal to 16. The first eight elements in the CSD sequence are 0, −400, −200, −600, −350, −650, −100, and −750. The last eight elements in the CSD sequence include −550, −250, −500, −150, −700, −50, −450, and −300.

In some possible designs, L is equal to 16. The first element in the CSD sequence is 0. The last 15 elements in the CSD sequence include −550, −225, −675, −325, −100, −450, −275, −500, −50, −725, −600, −375, −150, −575, and −475.

For technical effect brought by any possible design of the second aspect, refer to technical effect brought by corresponding designs of the first aspect. Details are not described herein again.

According to a third aspect, this application provides a communication apparatus, configured to implement the foregoing methods. The communication apparatus may be the first communication apparatus in the first aspect, an apparatus including the first communication apparatus, or an apparatus included in the first communication apparatus, for example, a chip. Alternatively, the communication apparatus may be the second communication apparatus in the second aspect, an apparatus including the second communication apparatus, or an apparatus included in the second communication apparatus, for example, a chip. The communication apparatus includes a corresponding module, unit, or means (means) for implementing the foregoing method. The module, unit, or means may be implemented by hardware, software, or hardware executing corresponding software. The hardware or the software includes one or more modules or units corresponding to the foregoing functions.

In some possible designs, the communication apparatus may include a processing module and a transceiver module. The transceiver module may also be referred to as a transceiver unit, and is configured to implement a sending function and/or a receiving function according to any one of the foregoing aspects or the possible implementations of the foregoing aspects. The transceiver module may include a transceiver circuit, a transceiver machine, a transceiver, or a communication interface. The processing module may be configured to implement a processing function according to any one of the foregoing aspects or the possible implementations of the foregoing aspects.

In some possible implementations, the transceiver module includes a sending module and a receiving module, respectively configured to implement the sending function and the receiving function according to any one of the foregoing aspects or the possible implementations of the foregoing aspects.

The communication apparatus provided in the third aspect is configured to perform any one of the first aspect or the possible implementations of the first aspect. For specific details, refer to any one of the first aspect or the possible implementations of the first aspect. Details are not described herein again.

According to a fourth aspect, this application provides a communication apparatus. The apparatus includes a processor and a memory. The memory is configured to store computer instructions. When the processor executes the instructions, the communication apparatus is enabled to perform the method according to any one of the foregoing aspects. The communication apparatus may be the first communication apparatus in the first aspect, an apparatus including the first communication apparatus, or an apparatus included in the first communication apparatus, for example, a chip. Alternatively, the communication apparatus may be the second communication apparatus in the second aspect, an apparatus including the second communication apparatus, or an apparatus included in the second communication apparatus, for example, a chip.

According to a fifth aspect, this application provides a communication apparatus, including a processor and a communication interface. The communication interface is configured to communicate with a module except for the communication apparatus. The processor is configured to execute a computer program or instructions, so that the communication apparatus performs the method according to any one of the foregoing aspects. The communication apparatus may be the first communication apparatus in the first aspect, an apparatus including the first communication apparatus, or an apparatus included in the first communication apparatus, for example, a chip. Alternatively, the communication apparatus may be the second communication apparatus in the second aspect, an apparatus including the second communication apparatus, or an apparatus included in the second communication apparatus, for example, a chip.

According to a sixth aspect, this application provides a communication apparatus, including an interface circuit and a logic circuit. The interface circuit is configured to obtain input information and/or output output information. The logic circuit is configured to perform the method according to any one of the foregoing aspects or the possible implementations of the foregoing aspects, perform processing based on the input information, and/or generate the output information.

According to a seventh aspect, this application provides a communication apparatus, including at least one processor. The processor is configured to execute a computer program or instructions stored in a memory, so that the communication apparatus performs the method according to any one of the foregoing aspects. The memory may be coupled to the processor, or may be independent of the processor. The communication apparatus may be the first communication apparatus in the first aspect, an apparatus including the first communication apparatus, or an apparatus included in the first communication apparatus, for example, a chip. Alternatively, the communication apparatus may be the second communication apparatus in the second aspect, an apparatus including the second communication apparatus, or an apparatus included in the second communication apparatus, for example, a chip.

In some possible designs, the apparatus is a chip or a chip system. When the apparatus is the chip system, the apparatus may include a chip, or may include the chip and another discrete component.

According to an eighth aspect, this application provides a computer-readable storage medium. The computer-readable storage medium stores instructions. When the instructions are run on a communication apparatus, the communication apparatus is enabled to perform the method according to any one of the foregoing aspects.

According to a ninth aspect, this application provides a computer program product including instructions. When the computer program product runs on a communication apparatus, the communication apparatus is enabled to perform the method according to any one of the foregoing aspects.

It may be understood that, when the communication apparatus provided in any one of the third aspect to the ninth aspect is a chip, the foregoing sending action/function may be understood as outputting data or information, and the foregoing receiving action/function may be understood as inputting data or information.

For technical effect brought by any one of the designs of the third aspect to the ninth aspect, refer to technical effect brought by different designs of the first aspect or the second aspect. Details are not described herein again.

According to a tenth aspect, this application provides a communication system. The communication system includes the first communication apparatus and the second communication apparatus according to the foregoing aspects.

DESCRIPTION OF EMBODIMENTS

Unless otherwise specified, "I" in the descriptions of embodiments of this application represents an "or" relationship between associated objects. For example, AB may represent A or B. In this application, "and/or" describes only an association relationship for describing associated objects and represents that three relationships may exist. For example, A and/or B may represent the following three cases: Only A exists, both A and B exist, and only B exists. A and B may be singular or plural. In addition, unless otherwise specified, "a plurality of" in the descriptions of this application means two or more than two. "At least one item (piece) of the following" or a similar expression thereof refers to any combination of these items, including any combination of singular items (pieces) or plural items (pieces). For example, at least one (piece) of a, b, or c may represent: a, b, c, a and b, a and c, b and c, or a, b, and c, where a, b, and c may be singular or plural. In addition, to clearly describe the technical solutions in embodiments of this application, terms such as first and second are used in embodiments of this application to distinguish between same items or similar items that provide basically same functions or purposes. A person skilled in the art may understand that the terms such as "first" and "second" do not constitute a limitation on a quantity or an execution sequence, and that the terms such as "first" and "second" do not indicate a definite difference.

It should be noted that, in this application, the terms such as "for example" or "such as" are used for representing giving an example, an illustration, or a description. Any embodiment or design scheme described as an "example" or "for example" in this application should not be explained as being more preferred or having more advantages than another embodiment or design scheme. Exactly, use of the word such as "example" or "for example" is intended to present a relative concept in a specific manner.

To facilitate understanding of the technical solutions in embodiments of this application, a related technology in this application is first briefly described as follows:

1. Frame Structure of a PPDU in the 802.11n Standard

Figure 1:
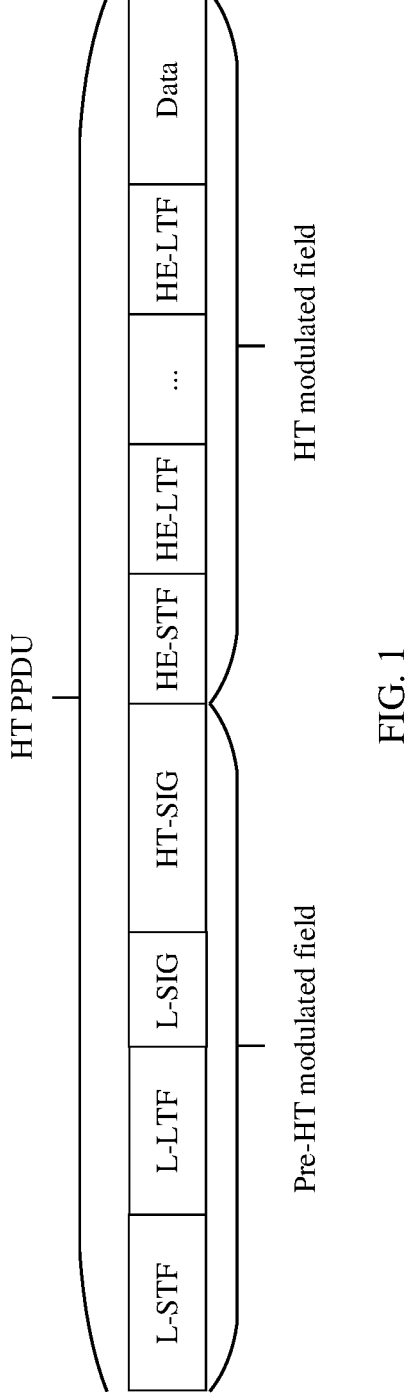
FIG. 1 is a schematic diagram 1 of a frame structure of a PPDU according to an embodiment of this application.

FIG. 1 shows a frame structure of a high throughput (high throughput, HT) PPDU in the 802.11n standard.

The HT PPDU includes two parts depending on a modulation mode. One part is set for compatibility with a legacy frame, and is referred to as a pre-HT modulated field. The part includes a legacy-short training field (legacy-short training field, L-STF), a legacy-long training field (legacy-long training field, L-LTF), a legacy-signal field (legacy-signal field, L-SIG), and a high throughput signal field (high throughput signal field, HT-SIG). The other part is HT-modulated, and is referred to as an HT field. The part includes a high throughput short training field (high throughput short training field, HT-STF), a high throughput long training field (high throughput long training field, HT-LTF), and a data (Data) field.

2. Frame Structure of a PPDU in the 802.11ac Standard

Figure 2:
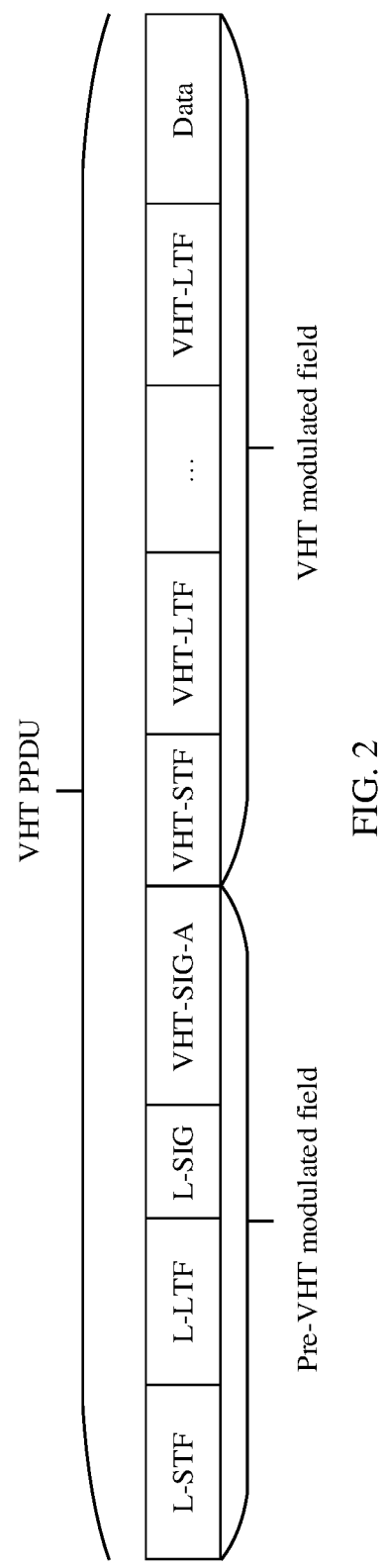
FIG. 2 is a schematic diagram 2 of a frame structure of a PPDU according to an embodiment of this application.

FIG. 2 shows a frame structure of a very high throughput (very high throughput, VHT) PPDU in the 802.11ac standard.

Similar to the HT PPDU in 802.11n, the VHT PPDU also includes two parts. One part is a pre-VHT field compatible with a legacy frame structure, and includes an L-STF, an L-LTF, an L-SIG, and a very high throughput signal field A (very high throughput signal field A, VHT-SIG-A). The other part is VHT-modulated, and is referred to as a VHT field. The part includes a very high throughput short training field (very high throughput short training field, VHT-STF), a very high throughput long training field (very high throughput long training field, VHT-LTF), a very high throughput signal field B (very high throughput signal field B, VHT-SIG-B), and a data (Data) field.

3. Frame Structure of a PPDU in the 802.11ax Standard

Figure 3:
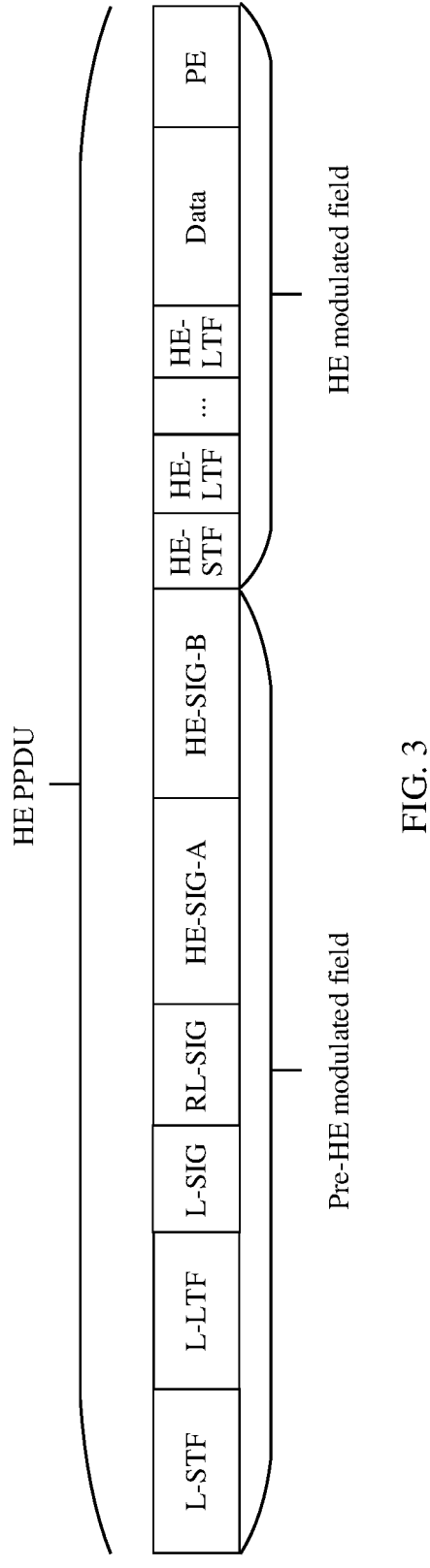
FIG. 3 is a schematic diagram 3 of a frame structure of a PPDU according to an embodiment of this application.

FIG. 3 shows a frame structure of a high efficiency (high efficiency, HE) PPDU in the 802.11ax standard.

Similar to the HT PPDU in 802.11n, the HE PPDU also includes two parts. One part is a pre-HE field, and includes an L-STF, an L-LTF, an L-SIG, a repeated legacy-signal field (repeated legacy-signal field, RL-SIG), a high efficiency-signal field A (high efficient-signal field A, HE-SIG A), and a high efficiency-signal field B (high efficient-signal field B, HE-SIG B). The other part is an HE modulated field, and includes a high efficiency-short training field (high efficient-short training field, HE-STF), a high efficiency-long training field (high efficient-long training field, HE-LTF), and a data (data) field. Optionally, the PPDU may further include a packet extension (packet extension, PE).

4. Frame Structure of a PPDU in the 802.11be Standard

Figure 4:
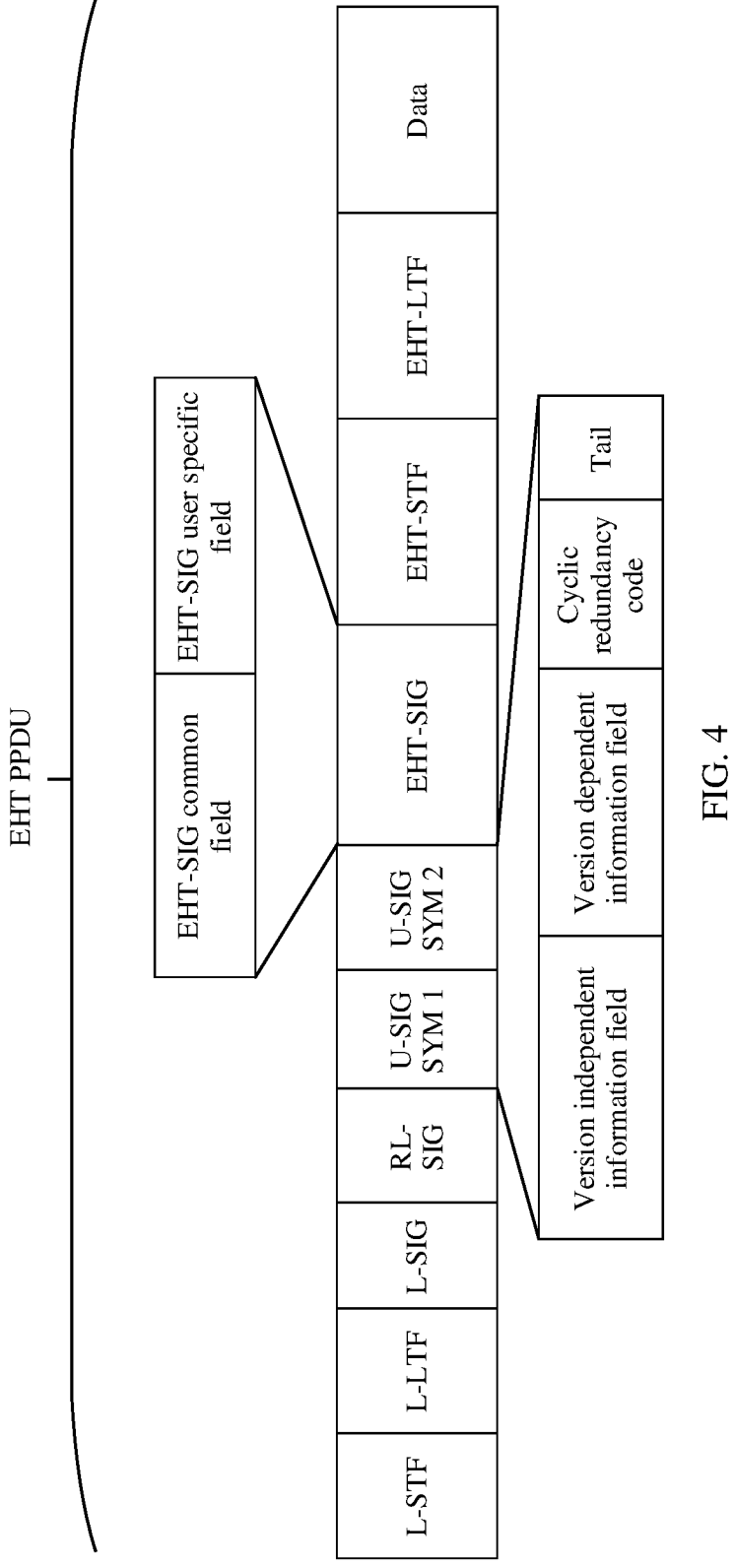
FIG. 4 is a schematic diagram 4 of a frame structure of a PPDU according to an embodiment of this application.

FIG. 4 shows a frame structure of an extremely high throughput (extremely high throughput, EHT) PPDU that may be used in 802.11be. The EHT PPDU may include three parts: a legacy preamble (legacy preamble, L-preamble), a high efficiency preamble (high efficiency preamble, HE-preamble), and a physical layer convergence protocol service data unit (physical layer convergence protocol service data unit, PSDU).

The L-preamble part includes an L-STF field, an L-LTF field, and an L-SIG field. The HE-preamble part includes an RL-SIG field, a universal SIG (universal SIG, U-SIG) field, an extremely high throughput signal (EHT-SIG) field, an extremely high throughput short training field (extremely high throughput short training field, EHT-STF), and an extremely high throughput long training field (extremely high throughput long training field, EHT-LTF). The PSDU part includes a field such as a data (data) field. The U-SIG field occupies two OFDM symbols such as a U-SIG SYM 1 and a U-SIG SYM 2 shown in FIG. 4. The universal (U-SIG) field may include a version independent information (version independent info) field, a version dependent information (version dependent info) field, a cyclic redundancy code (cyclic redundancy code, CRC) field, and a tail field. The version independent information field may include a Wi-Fi (wireless fidelity, Wi-Fi) version field of 3 bits, a downlink/uplink field of 1 bit, a BSS color field of at least 6 bits, and a transmission opportunity (transmit opportunity, TXOP) field of at least 7 bits. Further, the version independent information field may further include a bandwidth field. The version dependent information field may include a PPDU format field and the like, and may further include one or more of a modulation and coding scheme field, a spatial stream field, an encoding field, and the like. The CRC field occupies at least 4 bits, and the tail field occupies at least 6 bits of a tail bit field.

In a possible implementation, the EHT-SIG field includes an EHT-SIG common field and an EHT-SIG user specific field. The EHT-SIG common field may be used to carry resource allocation information allocated to a station, and the EHT-SIG user specific field may be used to carry user information.

It should be understood that the EHT-PPDU is merely an example. In a standard formulation process or a technical development process, there may be another structure. This is not limited in this application.

To greatly improve a service transmission rate of a WLAN system, the IEEE introduces a MIMO technology on the basis of an OFDM technology. In a WLAN-MIMO system, a PPDU is mapped to a plurality of spatial streams for sending. On each spatial stream, an STF transmits a same sequence, and a data field transmits different service data. For an 802.11n device, a receive end sets an automatic gain control (automatic gain control, AGC) gain by referring to power of an HT-STF on each spatial stream, and uses the gain to adjust power of an HT-data field on a corresponding spatial stream. For an 802.11ac device, a receive end sets an AGC gain by referring to power of a VHT-STF on each spatial stream, and uses the gain to adjust power of a VHT-data field on a corresponding spatial stream. For an 802.11ax device, a receive end sets an AGC gain by referring to power of an HE-STF on each spatial stream, and uses the gain to adjust power of an HE-data field on a corresponding spatial stream.

However, because STFs transmit a same sequence on spatial streams, from a perspective of the receive end, an STF sequence easily generates unnecessary beamforming (beamforming, BF) effect after passing a channel. To be specific, the STFs are superimposed on different spatial streams when phases are similar, and the STFs are cancelled when the phases are reverse. Overall, receive power of the STF changes in a large range, while receive power of a data part is stable. In other words, a ratio of the power of the STF to the power of the data field changes in a large range, and there is a large AGC gain setting error.

In view of this, when sending the PPDU, a transmit end separately performs cyclic shift diversity (cyclic shift diversity, CSD) on spatial streams of the HT modulated field of the PPDU in the 802.11n standard, the VHT modulated field of the PPDU in the 802.11ac standard, or the HE modulated field of the PPDU in the 802.11ax standard for some time, to reduce a correlation between HT-STFs on the spatial streams, a correlation between VHT-STFs on the spatial streams, or a correlation between HE-STFs on the spatial streams.

When the CSD is used to reduce a correlation between STFs on the spatial streams, a CSD value needs to be properly designed, so that a degree of correlation between the STFs on the spatial streams is small enough. Currently, CSD values of 1 to 4 streams are defined in the 802.11n standard, as shown in Table 1.

In Table 1, cells not filled with data indicate that there is no corresponding CSD value. When a number of spatial streams is 1, cyclic shift is not performed. When a number of spatial streams is 2, cyclic shift is not performed on a first spatial stream, and a cyclic shift value corresponding to a second spatial stream is −400 ns. To be specific, a signal of the first 400 ns of an original STF is shifted to a tail of the STF. Similarly, a signal of the first 400 ns of an original data field is shifted to a tail of the data field. When a number of spatial streams is 3, cyclic shift is not performed on a first spatial stream, a cyclic shift value corresponding to a second spatial stream is −400 ns, and a cyclic shift value corresponding to a third spatial stream is −200 ns. When a number of spatial streams is 4, cyclic shift is not performed on a first spatial stream, a cyclic shift value corresponding to a second spatial stream is −400 ns, a cyclic shift value corresponding to a third spatial stream is −200 ns, and a cyclic shift value corresponding to a fourth spatial stream is −600 ns.

TABLE 1

| Number of spatial streams | CSD value of each spatial stream (unit: nanosecond, (nanosecond, ns)) | | | |
| --- | --- | --- | --- | --- |
| | $1^{st}$ stream | $2^{nd}$ stream | $3^{rd}$ stream | $4^{th}$ stream |
| 1 | 0 | — | — | — |
| 2 | 0 | −400 | — | — |
| 3 | 0 | −400 | −200 | — |
| 4 | 0 | −400 | −200 | −600 |

In addition, CSD values of 1 to 8 streams are defined in the 802.11ac standard, as shown in Table 2. For related descriptions, refer to related descriptions in Table 1. Details are not described herein again. The 802.11ax standard inherits the CSD value defined in the 802.11ac standard, that is, the CSD value shown in Table 2 is also used in the 802.11ax standard.

TABLE 2

| Number of spatial streams | CSD value of each spatial stream (unit: nanosecond, (nanosecond, ns)) | | | | | | | |
| --- | --- | --- | --- | --- | --- | --- | --- | --- |
| | $1^{st}$ stream | $2^{nd}$ stream | $3^{rd}$ stream | $4^{th}$ stream | $5^{th}$ stream | $6^{th}$ stream | $7^{th}$ stream | $8^{th}$ stream |
| 1 | 0 | — | — | — | — | — | — | — |
| 2 | 0 | −400 | — | — | — | — | — | — |
| 3 | 0 | −400 | −200 | — | — | — | — | — |
| 4 | 0 | −400 | −200 | −600 | — | — | — | — |
| 5 | 0 | −400 | −200 | −600 | −350 | — | — | — |
| 6 | 0 | −400 | −200 | −600 | −350 | −650 | — | — |
| 7 | 0 | −400 | −200 | −600 | −350 | −650 | −100 | — |
| 8 | 0 | −400 | −200 | −600 | −350 | −650 | −100 | −750 |

It should be noted that the CSD value in 802.11ac/802.11ax is compatible with the CSD value in 802.11n in design. In addition, CSD values of one to seven streams are respectively first 1 to 7 elements of CSD values of 8 streams.

It should be noted that a "spatial stream" in this application may also be referred to as a "space-time stream (space-time streams)", and the two may replace each other. This is not specifically limited in this application.

As communication requirements increase, current eight spatial streams may no longer be able to meet some communication requirements. In view of this, this application provides a CSD sequence-based communication method, to expand the spatial streams to 16 or more streams, so as to improve spectral efficiency. In addition, a corresponding CSD sequence is provided to reduce interference between STFs on each spatial stream and a gain setting error.

The following describes the technical solutions in embodiments of this application with reference to the accompanying drawings in embodiments of this application.

A cyclic shift diversity-based method provided in embodiments of this application may be applied to a first communication system. The first communication system is a WLAN-MIMO system, and supports a first communication protocol. The first communication protocol is a new communication protocol relative to a second communication protocol. For example, the first communication protocol may be the 802.11be protocol or a new communication protocol relative to the 802.11be protocol, and the second communication protocol may be one or more of 802.11ax, 802.11ac, 802.11n, 802.11g, 802.11b, and 802.11a.

Figure 5A:
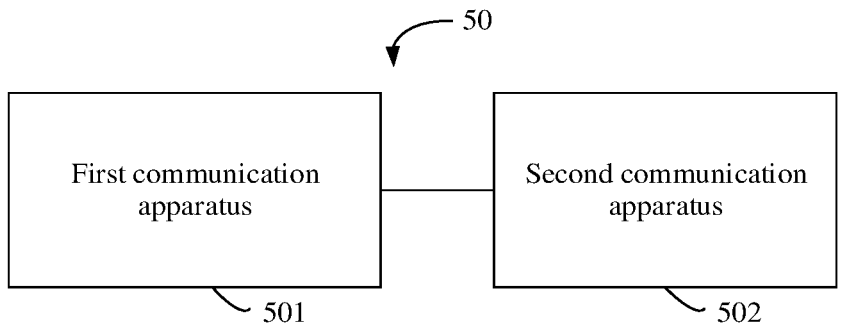
FIG. 5a is a schematic diagram of an architecture of a communication system according to an embodiment of this application.

A maximum number of spatial streams defined in the first communication protocol is L. L is a positive integer greater than or equal to 16. In other words, the maximum number of spatial streams is expanded to 16, or more than 16 in the first communication protocol. Optionally, FIG. 5a is a schematic diagram of a structure of a first communication system 50 according to this application. The first communication system 50 includes at least one first communication apparatus 501 and at least one second communication apparatus 502.

The first communication apparatus 501 supports the first communication protocol (for example, the 802.11be protocol). In other words, a maximum number of spatial streams supported by the first communication apparatus 501 is L. Further, the first communication apparatus 501 may further support a plurality of WLAN protocols such as 802.11ax, 802.11ac, 802.11n, 802.11g, 802.11b, and 802.11a.

The second communication apparatus 502 supports the first communication protocol (for example, the 802.11be protocol). In other words, a maximum number of spatial streams supported by the second communication apparatus is L. Further, the second communication apparatus 502 may further support a plurality of WLAN protocols such as 802.11ax, 802.11ac, 802.11n, 802.11g, 802.11b, and 802.11a.

It should be noted that, that the first communication apparatus 501 supports the first communication protocol may also be understood as that the first communication apparatus 501 is a first communication protocol device (device). Similarly, that the second communication apparatus 502 supports the first communication protocol may also be understood as that the second communication apparatus 502 is a first communication protocol device (device). Therefore, in this application, the first communication apparatus 501 may also be referred to as a first communication protocol device 501, for example, an 802.11be device 501, and the second communication apparatus 502 may also be referred to as a first communication protocol device 502, for example, an 802.11be device 502.

Optionally, the first communication apparatus 501 or the second communication apparatus 502 each includes at least one affiliated station (affiliated station, affiliated STA). The affiliated station may be an access point station (access point station STA, AP STA) or a non-access point station (non-access point station, non-AP STA). For ease of description, in this application, a communication apparatus whose affiliated station is the AP STA is referred to as an access point, and a communication apparatus whose affiliated station is the non-AP STA is referred to as the non-access point station.

In other words, the first communication apparatus 501 may be the access point, and correspondingly, the second communication apparatus 502 may be the non-access point station. Alternatively, the first communication apparatus 501 may be the non-access point station, and the second communication apparatus 502 may be the access point. Alternatively, both the first communication apparatus 501 and the second communication apparatus 502 are the access points. Alternatively, both the first communication apparatus 501 and the second communication apparatus 502 are the non-access point stations.

Figure 5B:
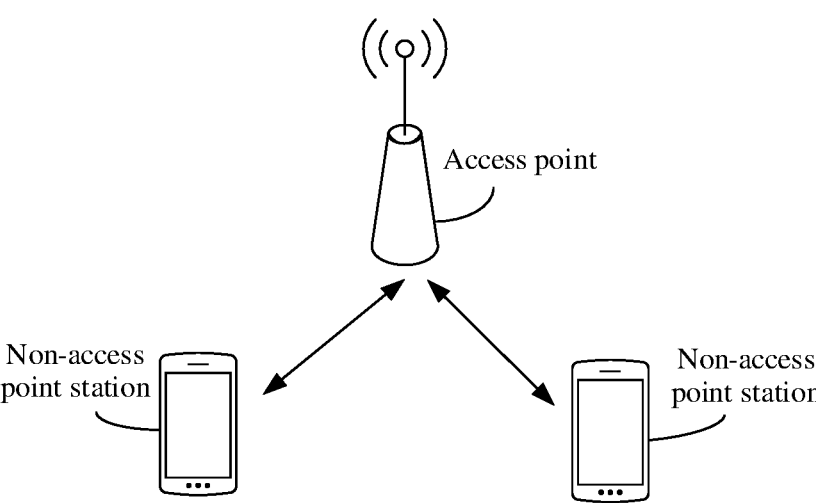
FIG. 5b is a schematic diagram of an architecture of another communication system according to an embodiment of this application.

Specifically, for example, one of the first communication apparatus 501 and the second communication apparatus 502 is the access point, and the other is the non-access point station. The first communication system may be shown in FIG. 5b.

It should be noted that, in an implementation, the non-AP STA may implement functions of the AP, or the non-AP STA may be operated as the AP. A communication apparatus whose affiliated station is the non-AP STA that can implement the functions of the AP or the non-AP STA that can be operated as the AP may be referred to as a soft access point. The access point in this application may include the soft access point. Certainly, the access point is not limited to the soft access point.

Optionally, the access point in this application may be an access point used by a mobile subscriber to access a wired network, and is mainly deployed in a home, inside a building, and insider a campus, with a typical coverage radius of tens of meters to hundreds of meters. Certainly, the access point may alternatively be deployed outdoors. The access point is equivalent to a bridge that connects the wired network and a wireless network. A main function of the access point is to connect various wireless network clients together and then connect the wireless network to the Ethernet. Specifically, the access point may be a terminal device or a network device with a wireless fidelity (wireless fidelity, Wi-Fi) chip.

The access point may support the first communication protocol (for example, the 802.11be protocol). Further, the access point may further support a plurality of WLAN protocols such as 802.11ax, 802.11ac, 802.11n, 802.11g, 802.11b, and 802.11a.

Optionally, the non-access point station in this application may be a wireless communication chip, a wireless sensor, or a wireless communication terminal, for example, a mobile phone that supports a Wi-Fi communication function, a tablet computer that supports a Wi-Fi communication function, a set-top box that supports a Wi-Fi communication function, a smart television that supports a Wi-Fi communication function, a smart wearable device that supports a Wi-Fi communication function, a vehicle-mounted communication device that supports a Wi-Fi communication function, or a computer that supports a Wi-Fi communication function.

The non-access point station may support the first communication protocol (for example, the 802.11be protocol). Further, the non-access point station may further support a plurality of WLAN protocols such as 802.11ax, 802.11ac, 802.11n, 802.11g, 802.11b, and 802.11a.

Optionally, the access point in this application may include one or more antennas, that is, the access point may be a single-antenna device or a multi-antenna device. Similarly, the non-access point station may include one or more antennas, that is, the non-access point station may be a single-antenna device or a multi-antenna device.

Figure 6:
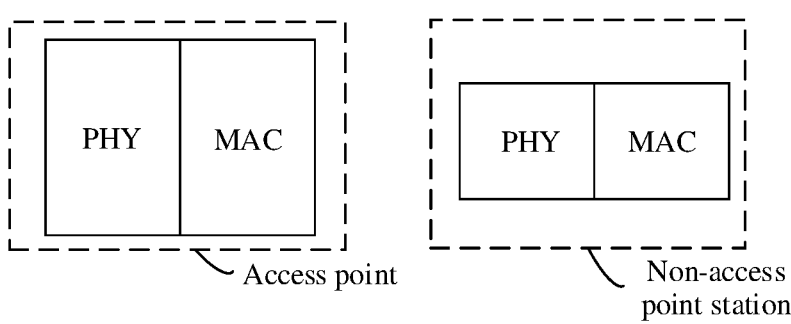
FIG. 6 is a schematic diagram of structures of an access point and a non-access point station according to an embodiment of this application.

Optionally, FIG. 6 is a schematic diagram of structures of the access point and the non-access point station. The access point and the station each include a physical layer (physical layer, PHY) and a medium access control (medium access control, MAC) layer. The solution in this application is a protocol design at the PHY layer and the MAC layer. It may be understood that FIG. 6 may be considered as division of the access point and the non-access point station from a perspective of a logical function.

Figures 7, 8:
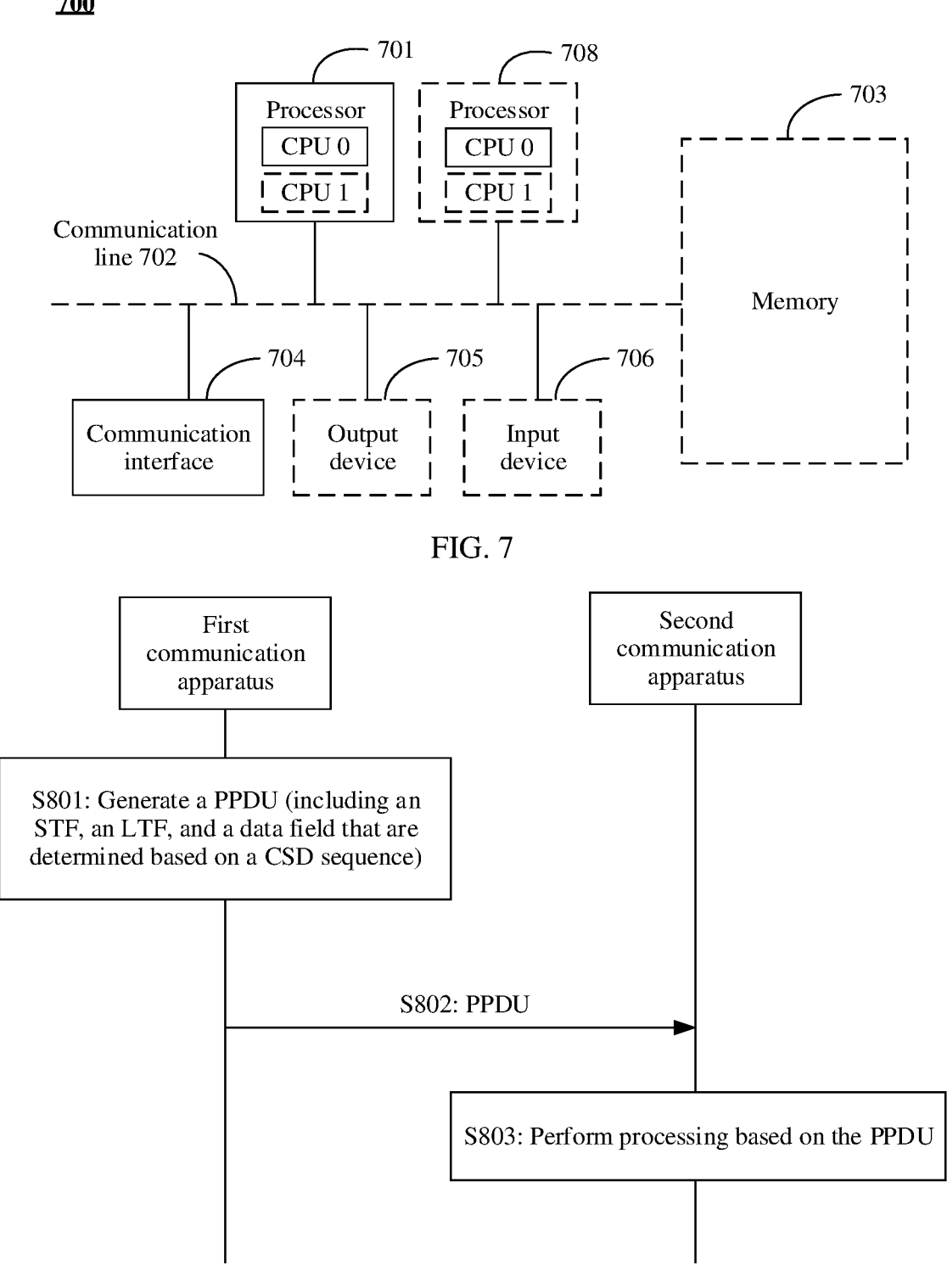
FIG. 7 is a schematic diagram of a structure of a communication apparatus according to an embodiment of this application.
FIG. 8 is a schematic flowchart of a CSD sequence-based communication method according to an embodiment of this application.

Optionally, in specific implementation, the first communication apparatus 501 or the second communication apparatus 502 may be implemented by using a communication apparatus in FIG. 7. FIG. 7 is a schematic diagram of a hardware structure of a communication apparatus 700 according to this application. The communication apparatus 700 includes a processor 701 and at least one communication interface (FIG. 7a is described merely by using an example in which the communication apparatus includes a communication interface 704). Optionally, the communication apparatus 700 may further include a communication line 702 and a memory 703.

The processor 701 may be a general-purpose central processing unit (central processing unit, CPU), a microprocessor, an application-specific integrated circuit (application-specific integrated circuit, ASIC), or one or more integrated circuits configured to control program execution in the solutions of this application.

The communication line 702 may include a path on which information is transmitted between the foregoing components.

The communication interface 704 uses any apparatus such as a transceiver, to communicate with another device or a communication network, for example, the Ethernet, a radio access network (radio access network, RAN), or a wireless local area network (wireless local area network, WLAN).

The memory 703 may be a read-only memory (read-only memory, ROM) or another type of static storage device that can store static information and instructions, a random access memory (random access memory, RAM) or another type of dynamic storage device that can store information and instructions, an electrically erasable programmable read-only memory (electrically erasable programmable read-only memory, EEPROM), a compact disc read-only memory (compact disc read-only memory, CD-ROM) or another optical disc storage, optical disk storage (including compressed optical discs, laser discs, optical discs, digital versatile optical discs, Blu-ray discs, and the like), magnetic disk storage medium or another magnetic storage device, or any other medium capable of carrying or storing desired program code in the form of instructions or data structures and capable of being accessed by a computer, but not limited thereto. The memory may independently exist and is connected to the processor through the communication line 702. Alternatively, the memory may be integrated with the processor.

The memory 703 is configured to store computer-executable instructions for executing the solutions of this application, and the processor 701 controls the execution. The processor 701 is configured to execute the computer-executable instructions stored in the memory 703, to implement a cyclic shift diversity-based communication method provided in the following embodiments of this application.

Optionally, the computer-executable instructions in this embodiment of this application may also be referred to as application program code or computer program code. This is not specifically limited in this embodiment of this application.

During specific implementation, in an embodiment, the processor 701 may include one or more CPUs such as a CPU 0 and a CPU 1 shown in FIG. 7.

During specific implementation, in an embodiment, the communication apparatus 700 may include a plurality of processors, for example, the processor 701 and a processor 708 in FIG. 7. Each of the processors may be a single-core processor (single-CPU) or a multi-core processor (multi-CPU). Herein, the processor may be one or more devices, circuits, and/or processing cores configured to process data (for example, computer program instructions).

During specific implementation, in an embodiment, the communication apparatus 700 may further include an output device 705 and an input device 706. The output device 705 communicates with the processor 701, and may display information in a plurality of manners. For example, the output device 705 may be a liquid crystal display (liquid crystal display, LCD), a light emitting diode (light emitting diode, LED) display device, a cathode ray tube (cathode ray tube, CRT) display device, a projector (projector), or the like. The input device 706 communicates with the processor 701, and may receive an input from a user in a plurality of manners. For example, the input device 706 may be a mouse, a keyboard, a touchscreen device, or a sensor device.

The following uses an example in which a method in this application is applied to the communication system shown in FIG. 5a, and describes a cyclic shift diversity-based communication method provided in embodiments of this application with reference to the accompanying drawings.

It should be noted that names of messages between apparatuses, names of parameters in the messages, or the like in the following embodiments of this application are merely examples, and there may be other names during specific implementation. This is not specifically limited in embodiments of this application.

FIG. 8 is a cyclic shift diversity-based communication method according to an embodiment of this application. The method includes the following steps.

S801: A first communication apparatus generates a PPDU.

The PPDU includes a short training field (short training field, STF), a long training field (long training field, LTF), and a data (Data) field.

It should be noted that, in the following embodiments of this application, unless otherwise specified, the PPDU generated by the first communication apparatus is a PPDU of a first communication protocol, and the STF and the LTF included in the PPDU are respectively a non-legacy STF and a non-legacy LTF.

For example, the first communication protocol is the 802.11be protocol. A frame structure of the PPDU generated by the first communication apparatus may be shown in FIG. 4. In this application, the STF included in the PPDU is an EHT-STF, and the LTF included in the PPDU is an EHT-LTF.

The STF, the LTF, and the data field included in the PPDU are determined based on a CSD sequence. The CSD sequence includes L elements. According to the foregoing descriptions, L is a maximum number of spatial streams defined in the first communication protocol. If the first communication apparatus supports the first communication protocol, L is also the maximum number of spatial streams supported by the first communication apparatus. The maximum number of spatial streams is greater than or equal to 16.

It should be noted that, the maximum number of spatial streams supported by the first communication apparatus may also be understood as that the first communication apparatus has a capability of sending and receiving L spatial streams, in other words, the first communication apparatus has (have) a maximum of L spatial streams.

Optionally, when generating the PPDU, the first communication apparatus may perform, based on a $k^{th}$ element in the CSD sequence, cyclic shift on an original STF sequence, an original LTF sequence, and an original data sequence that correspond to a $k^{th}$ spatial stream, to respectively obtain an STF sequence, an LTF sequence, and a data sequence that are transmitted on the $k^{th}$ spatial stream. The STF sequence, the LTF sequence, and the data sequence are respectively carried in an STF, an LTF, and a data field. k=1, 2, . . . , K. K is a number of spatial streams actually used by the first communication apparatus.

S802: The first communication apparatus sends the PPDU to a second communication apparatus. Correspondingly, the second communication apparatus receives the PPDU from the first communication apparatus.

Optionally, the first communication apparatus sends the PPDU to the second communication apparatus by using K spatial streams. Correspondingly, the second communication apparatus receives the PPDU from the second communication apparatus by using the K spatial streams. K is a positive integer less than or equal to L.

For example, when the PPDU is sent to the second communication apparatus by using the K spatial streams, a data part of the PPDU is divided into K parts that are respectively sent on the K spatial streams. A preamble part of the PPDU except the data part is not limited in this application.

In other words, the first communication apparatus may send the PPDU by using less than L spatial streams. In an actual application, due to complex and diversified channel environments, a larger number of spatial streams do not indicate higher spectral efficiency or transmission performance. Therefore, according to this solution, when sending the PPDU, the first communication apparatus may determine, based on an actual channel condition, to send the PPDU by using less than L spatial streams, so as to maximize the spectral efficiency as much as possible. Certainly, when a channel condition is good, K may be equal to L, to be specific, the first communication apparatus sends the PPDU by using the L spatial streams, to maximize the spectral efficiency.

Optionally, when the first communication apparatus sends the PPDU to the second communication apparatus by using the K spatial streams, the STF, the LTF, and the data field of the PPDU are determined based on the first K elements in the CSD sequence. In other words, an element that is actually used and that is of the CSD sequence is related to a number of spatial streams for sending the PPDU or mapping the PPDU.

Optionally, when receiving the PPDU, the second communication apparatus may set an AGC gain based on power of an STF on each spatial stream, and use the gain to adjust power of a data field on a corresponding spatial stream. Because the first communication apparatus in this application uses the CSD sequence in the STF, the LTF, and the data field, there is a small error when the second communication apparatus adjusts the power of the data field based on the power of the STF.

S803: The second communication apparatus performs processing based on the PPDU.

Optionally, the second communication apparatus may process a service based on data carried in the data field of the PPDU. This is not specifically limited in this application.

According to this solution, the maximum number of spatial streams may be expanded from 8 to 16. Therefore, this solution is applicable to a communication scenario with a high communication requirement and a large amount of data. This improves a system capacity and spectral efficiency. In addition, compared with expanding the maximum number of spatial streams to more than 16, limiting the maximum number of spatial streams to 16 can reduce a requirement on a number of antennas of an access point or a non-access point station, thereby reducing implementation complexity of the access point or the non-access point station. Further, if a problem of implementation complexity of the access point or the non-access point station has been resolved, for example, when the access point or the non-access point can support a larger number of antennas, and a communication requirement increases, the maximum number of spatial streams can be expanded to more than 16, for example, 32 or 64, to further improve the system capacity and the spectral efficiency. Based on a maximum number of expanded spatial streams in this application, a corresponding CSD sequence is further used in the STF, the LTF, and the data field in this application, to reduce a correlation between STFs on the spatial streams, and correspondingly reduce an AGC gain setting error when AGC is performed based on power of the STF.

The foregoing describes a process of the CSD sequence-based communication method provided in this application, and the following describes in detail the CSD sequence provided in this application.

When L is equal to 16, that is, the maximum number of spatial streams is 16, this application provides two types of possible CSD sequences.

In a possible implementation, the first eight elements in a first-type CSD sequence provided in this application are 0, −400, −200, −600, −350, −650, −100, and −750, and the last eight elements in the CSD sequence include −550, −250, −500, −150, −700, −50, −450, and −300.

It should be noted that, only the following is limited in this application: The last eight elements in the CSD sequence include −550, −250, −500, −150, −700, −50, −450, and −300. An order of the eight elements in the CSD sequence is not unique.

For example, in a possible case, the CSD sequence may be:

[0 −400 −200 −600 −350 −650 −100 −750 −550 −250 −500 −150 −700 −50 −450 −300] (denoted as a CSD sequence 1).

Alternatively, in another possible case, the CSD sequence may be:

[0 −400 −200 −600 −350 −650 −100 −750 −450 −550 −500 −150 −300 −50 −250 −700] (denoted as a CSD sequence 2).

It should be noted that, in this application, a CSD value corresponding to an $l^{th}$ spatial stream is an $l^{th}$ element in the CSD sequence, and l is a positive integer less than or equal to L. In other words, when a total number of spatial streams is l, the CSD sequence corresponding to the $l^{th}$ stream includes the first l elements in a CSD sequence corresponding to the 16 streams provided in this application.

Optionally, an element in the CSD sequence is in a unit of ns. With development or evolution of communication technologies, the element in the CSD sequence may be in another time unit, for example, microsecond (microsecond, μs). This is not specifically limited in this application.

Based on this possible implementation, the first four elements in the CSD sequence provided in this application are CSD values of 1 to 4 streams in the 802.11n protocol, and the first eight elements are CSD values of 1 to 8 streams in the 802.11ac protocol or the 802.11ax protocol. In other words, the CSD sequence is compatible with the 802.11n protocol, the 802.11ac protocol, or the 802.11ax protocol. This facilitates smooth evolution of a system. In addition, when the CSD sequence is compatible with the 802.11n protocol and an 802.11n data packet needs to be sent, or when the CSD sequence is compatible with the 802.11ac/ 802.11ax protocol and an 802.11ac/802.11ax data packet needs to be sent, cyclic shift may be directly performed based on the CSD sequence provided in this application. This can reduce implementation complexity, compared with cyclic shift separately performed on a corresponding standard data packet based on a plurality of standard CSD sequences.

The following provides a CSD sequence determining method, and a CSD sequence corresponding to the 16 streams may be determined according to the method. Certainly, the CSD sequence corresponding to the 16 streams provided in this application may alternatively be determined according to another method. This is not specifically limited in this application.

Figure 9:
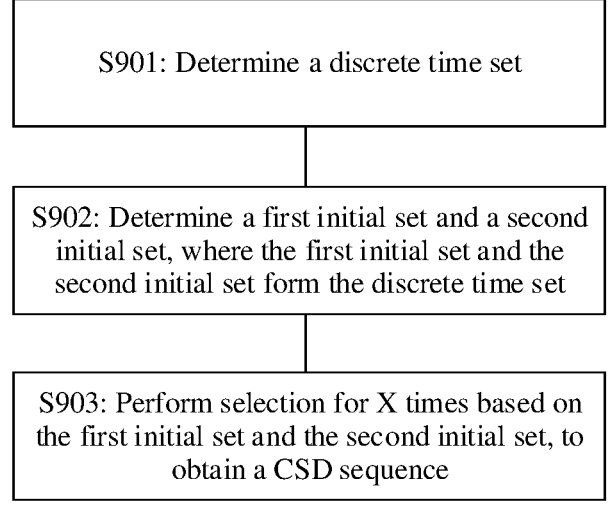
FIG. 9 is a schematic flowchart of determining a CSD sequence according to an embodiment of this application.

As shown in FIG. 9, the CSD sequence determining method provided in this application may include the following steps.

S901: Determine a discrete time set.

Optionally, a range of the discrete time set is determined based on a period of the STF. For example, a maximum element in the discrete time set is less than or equal to a period of the STF.

Optionally, time intervals between any two adjacent elements in the discrete time set are equal, and a quotient of the period of the STF divided by the time interval is a number of elements included in the discrete time set. In view of this, all elements in the discrete time set are multiples of the time interval.

It should be noted that, in this application, a number of elements included in the discrete set is Q times more than the maximum number of spatial streams L. Q is a positive integer greater than or equal to 2.

For example, it is assumed that the period of the STF is 800 ns, and the range of the discrete time set is [0, −800). If the time interval is −25 ns, the discrete time set is [0 −25 −50 −75 −100 −125 −150 −175 −200 −225 −250 −275 −300 −325 −350 −375 −400 −425 −450 −475 −500 −525 −550 −575 −600 −625 −650 −675 −700 −725 −750 −775].

It may be understood that, in this example, the time interval may alternatively be another value, for example, −12.5 ns or −6.25 ns. This is not specifically limited in this application.

S902: Determine a first initial set and a second initial set.

The second initial set includes Y elements in the discrete time set. The first initial set includes elements other than the Y elements in the discrete time set.

Further, the Y elements included in the second initial set form a CSD sequence defined in the second communication protocol. For example, the second communication protocol is the 802.11ac protocol or the 802.11ax protocol. Y is equal to 8. The second initial set is [0 −400 −200 −600 −350 −650 −100 −750].

Based on the discrete time set shown in step S901, the first initial set is [−25 −50 −75 −125 −150 −175 −225 −250 −275

−300 −325 −375 −425 −450 −475 −500 −525 −550 −575 −625 −675 −700 −725 −775].

S903: Perform selection for X times based on the first initial set and the second initial set, to obtain the CSD sequence.

The first Y elements in the CSD sequence are Y elements constituting the second initial set, and X is equal to L−Y. For example, if L is equal to 16, and Y is equal to 8, X is equal to 8, that is, selection is performed for eight times based on the first initial set and the second initial set.

Optionally, during selection for the $x^{th}$ time:

First, an $m^{th}$ element in an $x^{th}$ candidate set is added to the first Y+x−1 elements in the CSD sequence, to obtain an $m^{th}$ selected set. m=1, 2, . . . , M. M is a number of elements included in the $x^{th}$ candidate set. A candidate set is a subset of the first initial set. x=1, 2, . . . , X.

Then, a first selected set is selected from M selected sets, and elements constituting the first selected set are used as the first Y+x elements in the CSD sequence.

It should be noted that, when x is equal to 1, the $x^{th}$ candidate set, namely, a first candidate set, is the first initial set.

For example, the first initial set is [−25 −50 −75 −125 −150 −175 −225 −250 −275 −300 −325 −375 −425 −450 −475 −500 −525 −550 −575 −625 −675 −700 −725 −775], and the second initial set is [0 −400 −200 −600 −350 −650 −100 −750].

During selection for the first time:

the first candidate set is [−25 −50 −75 −125 −150 −175 −225 −250 −275 −300 −325 −375 −425 −450 −475 −500 −525 −550 −575 −625 −675 −700 −725 −775]. M is equal to 24.

The first Y+x−1=8 elements in the CSD sequence are 0, −400, −200, −600, −350, −650, −100, and −750.

M elements in the first candidate set are separately added after the first eight elements in the CSD sequence; in other words, one of the M elements in the first candidate set is newly added to the second initial set, to obtain the following M selected sets:

a first selected set is [0 −400 −200 −600 −350 −650 −100 −750 −25];

a second selected set is [0 −400 −200 −600 −350 −650 −100 −750 −50];

a third selected set is [0 −400 −200 −600 −350 −650 −100 −750 −75];

a fourth selected set is [0 −400 −200 −600 −350 −650 −100 −750 −125];

a fifth selected set is [0 −400 −200 −600 −350 −650 −100 −750 −150];

a sixth selected set is [0 −400 −200 −600 −350 −650 −100 −750 −175];

a seventh selected set is [0 −400 −200 −600 −350 −650 −100 −750 −225];

an eighth selected set is [0 −400 −200 −600 −350 −650 −100 −750 −250];

a ninth selected set is [0 −400 −200 −600 −350 −650 −100 −750 −275];

a tenth selected set is [0 −400 −200 −600 −350 −650 −100 −750 −300];

an $11^{th}$ selected set is [0 −400 −200 −600 −350 −650 −100 −750 −325];

a $12^{th}$ selected set is [0 −400 −200 −600 −350 −650 −100 −750 −375];

a $13^{th}$ selected set is [0 −400 −200 −600 −350 −650 −100 −750 −425];

a $14^{th}$ selected set is [0 −400 −200 −600 −350 −650 −100 −750 −450];

a 15<sup>th</sup> selected set is [0 −400 −200 −600 −350 −650 −100 −750 −475];

a 16<sup>th</sup> selected set is [0 −400 −200 −600 −350 −650 −100 −750 −500];

a 17<sup>th</sup> selected set is [0 −400 −200 −600 −350 −650 −100 −750 −525];

an 18<sup>th</sup> selected set is [0 −400 −200 −600 −350 −650 −100 −750 −550];

a 19<sup>th</sup> selected set is [0 −400 −200 −600 −350 −650 −100 −750 −575];

a 20<sup>th</sup> selected set is [0 −400 −200 −600 −350 −650 −100 −750 −625];

a 21<sup>st</sup> selected set is [0 −400 −200 −600 −350 −650 −100 −750 −675];

a 22<sup>nd</sup> selected set is [0 −400 −200 −600 −350 −650 −100 −750 −700];

a 23<sup>rd</sup> selected set is [0 −400 −200 −600 −350 −650 −100 −750 −725]; and a 24<sup>th</sup> selected set is [0 −400 −200 −600 −350 −650 −100 −750 −775].

The first selected set selected from the M selected sets is a selected set corresponding to the smallest first criterion value in the M selected sets. Further, when the M selected sets include a plurality of selected sets corresponding to the smallest first criterion value, the first selected set is a selected set with a smallest second criterion value in the plurality of selected sets corresponding to the smallest first criterion value.

Optionally, in this application, a first criterion value corresponding to a selected set is a largest non-diagonal element in a correlation matrix corresponding to the selected set. A second criterion value corresponding to the selected set is an average value of non-diagonal elements in the correlation matrix corresponding to the selected set. The correlation matrix corresponding to the selected set is used to feed back a correlation between STFs on N spatial streams. N is a number of elements included in the selected set.

Optionally, the correlation matrix corresponding to the selected set is determined based on a signal matrix corresponding to the selected set. A number of rows in the signal matrix is the number of elements included in the selected set. A number of columns in the signal matrix is a number of non-zero subcarriers. The non-zero subcarrier is a non-zero subcarrier in subcarriers constituting the STF. It should be noted that the non-zero subcarrier in the subcarriers constituting the STF does not include a subcarrier 0.

For example, it is assumed that a number of subcarriers constituting the STF is F, a value range of an index of a non-zero subcarrier in the F subcarriers is [−W, W], and W is a positive integer less than F. In addition, the index of the non-zero subcarrier is an integer (except 0) multiple of a spacing G, and the spacing G is related to a system bandwidth, the period of the STF, and the like.

For example, a system bandwidth of 20 megahertz (megahertz, MHz) is used. The number of subcarriers constituting the STF is 256, G is equal to 16, and the 256 subcarriers include 14 non-zero subcarriers. Indexes of the 14 non-zero subcarriers are −112, −96, −80, −64, −48, −32, −16, 16, 32, 48, 64, 80, 96, and 112.

Optionally, elements in a first row in the signal matrix corresponding to the selected set represent an STF signal on a non-zero subcarrier corresponding to a first spatial stream. Elements in an n<sup>th</sup> row in the signal matrix represent an STF signal cyclically shifted on a non-zero subcarrier corresponding to an n<sup>th</sup> spatial stream. The cyclic shift STF signal on the non-zero subcarrier corresponding to the n<sup>th</sup> spatial stream is determined based on an n<sup>th</sup> element in the selected set and the STF signal on the non-zero subcarrier corresponding to the first spatial stream. n=2, 3, . . . , N. N is the number of elements included in the selected set.

Specifically, the signal matrix corresponding to the selected set may be represented as:

$$S = \begin{bmatrix} s_{1,-W} & \cdots & s_{1,W} \\ \vdots & \ddots & \vdots \\ s_{N,-W} & \cdots & s_{N,W} \end{bmatrix}$$

In the formula:

$$s_{n,k}=s_{1,k}\cdot\exp(-j2\pi k\cdot\Delta f\cdot B(n))$$

k is an index of the non-zero subcarrier, $S_{1,k}$ is an STF signal on a non-zero subcarrier k corresponding to the first spatial stream, $S_{n,k}$ is an element in a signal matrix S, and represents a cyclic shift STF signal on a non-zero subcarrier k corresponding to the n<sup>th</sup> spatial stream, B(n) is an n<sup>th</sup> element in the selected set, $\Delta f$ is a subcarrier spacing, and exp represents an exponential function whose base is a natural constant e.

It may be understood that cyclic shift time corresponding to the n<sup>th</sup> spatial stream is an n<sup>th</sup> element in B(n).

For example, the number of subcarriers constituting the STF is 256, and the subcarriers include the 14 non-zero subcarriers. An STF signal on each non-zero subcarrier corresponding to the first spatial stream may be represented as:

$$x_{-112:16:112}=\frac{[-1\ -1\ -1\ 1\ 1\ 1\ -1\ 1\ 1\ -1\ 1\ 1\ -1\ 1]^*}{(1+j)/\sqrt{2}}$$

j is an imaginary unit.

Optionally, based on the signal matrix S corresponding to the selected set, a correlation matrix C corresponding to the selected set satisfies the following formula:

$$C=S*S^H$$

$S^H$ is a conjugate transpose matrix of S. Each non-diagonal element in the correlation matrix C represents a correlation between STFs on two spatial streams. For example, an element in a first row and a second column represents a correlation between an STF on a first spatial stream and an STF on a second spatial stream, or represents influence of the STF on the first spatial stream on the STF on the second spatial stream.

Based on the correlation matrix C corresponding to the selected set, a maximum value of non-diagonal elements in the correlation matrix C is used as the first criterion value of the selected set, and an average value of the non-diagonal elements is used as the second criterion value of the selected set.

In view of this, during the selection for x times, the selected set corresponding to the smallest first criterion value in the M selected sets is used as the first selected set. That is, in M correlation matrices respectively corresponding to the M selected sets, a maximum value of non-diagonal elements in a correlation matrix corresponding to the first selected set is smallest. Further, when a plurality of selected sets correspond to the smallest first criterion value, the first selected set is the selected set with the smallest second criterion value in the plurality of selected sets corresponding to the smallest first criterion value. That is, in the M correlation matrices respectively corresponding to the M selected sets, the maximum value of the non-diagonal elements in the correlation matrix corresponding to the first selected set is smallest, and an average value of the non-diagonal elements in the correlation matrix corresponding to the first selected set is smallest.

In other words, during the selection for x times, a selected set that corresponds to the smallest first criterion value or that corresponds to the smallest first criterion value and the smallest second criterion value is selected, and elements forming the selected set are used as the first $Y+x-1$ elements in the CSD sequence.

The enumerated 24 selected sets obtained through the selection for the first time are used as an example. A first criterion value and a second criterion value that correspond to each selected set are separately calculated according to a process, to obtain a first selected set corresponding to the selection for the first time. The first selected set may be the $14^{th}$ selected set [0 −400 −200 −600 −350 −650 −100 −750 −450], or the $18^{th}$ selected set [0 −400 −200 −600 −350 −650 −100 −750 −550].

In other words, in an implementation scenario, the first nine elements in the CSD sequence are 0, −400, −200, −600, −350, −650, −100, −750, and −450; or a CSD sequence corresponding to nine spatial streams is [0 −400 −200 −600 −350 −650 −100 −750 −450]. In another implementation scenario, the first nine elements in the CSD sequence are 0, −400, −200, −600, −350, −650, −100, −750, and −550; or a CSD sequence corresponding to nine spatial streams is [0 −400 −200 −600 −350 −650 −100 −750 −550].

It should be noted that, in one selection process, the plurality of selected sets may correspond to the smallest first criterion value, and the plurality of selected sets may correspond to the smallest second criterion value. In this case, the first selected set is not unique, and therefore an order of the last $L-Y$ elements in the finally obtained CSD sequence is not unique.

Optionally, after the first selected set is obtained through the selection for the $x^{th}$ time, the last element in the first selected set is further deleted from the $x^{th}$ candidate set, to obtain the (x+1)th candidate set, so as to perform selection for the (x+1)th time.

For example, when x is equal to 1, the selected first selected set is [0 −400 −200 −600 −350 −650 −100 −750 −550]. In this case, −550 is deleted from the first candidate set [−25 −50 −75 −125 −150 −175 −225 −250 −275 −300 −325 −375 −425 −450 −475 −500 −525 −550 −575 −625 −675 −700 −725 −775], to obtain the second candidate set [−25 −50 −75 −125 −150 −175 −225 −250 −275 −300 −325 −375 −425 −450 −475 −500 −525 −575 −625 −675 −700 −725 −775].

Therefore, during selection for the second time:

The second candidate set is [−25 −50 −75 −125 −150 −175 −225 −250 −275 −300 −325 −375 −425 −450 −475 −500 −525 −575 −625 −675 −700 −725 −775]. M is equal to 23.

The first $Y+x-1=9$ elements in the CSD sequence are 0, −400, −200, −600, −350, −650, −100, −750, and −550.

M elements in the second candidate set are respectively added to the first nine elements in the CSD sequence, to obtain the following M selected sets:

a first selected set is [0 −400 −200 −600 −350 −650 −100 −750 −550 −25];

a second selected set is [0 −400 −200 −600 −350 −650 −100 −750 −550 −50];

. . .

a $22^{nd}$ selected set is [0 −400 −200 −600 −350 −650 −100 −750 −550 −700]; and a $23^{rd}$ selected set is [0 −400 −200 −600 −350 −650 −100 −750 −550 −725].

Then, first criterion values and second criterion values that correspond to the 23 selected sets are calculated, and the first selected set in the 23 selected sets is selected to obtain the first 10 elements in the CSD sequence, or a CSD sequence corresponding to 10 spatial streams. Next, the foregoing process is repeated until an $L^{th}$ element in the CSD sequence is obtained, or until the CSD sequence includes the L elements.

For example, when L is equal to 16, the CSD sequence corresponding to the 16 spatial streams may be obtained by using the foregoing method: [0 −400 −200 −600 −350 −650 −100 −750 −550 −250 −500 −150 −700 −50 −450 −300] or [0 −400 −200 −600 −350 −650 −100 −750 −450 −550 −500 −150 −300 −50 −250 −700].

It may be understood that, in the foregoing embodiment of this application, a CSD sequence selection method is described only by using an example in which the period of the STF is 800 ns, the time interval is −25 ns, and L is equal to 16. Certainly, when one or more of the period of the STF, the time interval, and L are other values, the CSD sequence may alternatively be selected by using a method similar to that in FIG. 9. For example, the period of the STF is 800 ns, the time interval is −12.5 ns or −6.25 ns, and L is 32. Alternatively, the period of the STF is 800 ns, the time interval is −12.5 ns or −6.25 ns, and L is 16.

For example, when the period of the STF is 800 ns, the time interval is −12.5 ns or −6.25 ns, and L is 16, compared with the example shown in FIG. 9, the time interval is less than 25 ns, and a number of elements in the discrete time set is greater than 32. When a number of elements included in the second initial set is still 8, the number of elements included in the first initial set is greater than 24. Correspondingly, a number of candidate sets increases during selection for each time.

In conclusion, based on the method shown in FIG. 9, in each selection process, a selected set corresponding to the smallest first criterion value or corresponding to the smallest first criterion value and the smallest second criterion value is selected as the first l element in the CSD sequence, so that a correlation between STFs on l spatial stream is small enough, to reduce an AGC gain setting error. l is less than or equal to L.

For example, the first initial set is [−25 −50 −75 −125 −150 −175 −225 −250 −275 −300 −325 −375 −425 −450 −475 −500 −525 −550 −575 −625 −675 −700 −725 −775], the second initial set is [0 −400 −200 −600 −350 −650 −100 −750], and L is equal to 16. In an optimal case, a minimum value of first criterion values and a minimum value of second criterion values that respectively correspond to CSD sequences corresponding to 9 to 16 spatial streams are shown in Table 3. Through calculation, both the CSD sequence 1 and the CSD sequence 2 provided in this application can meet a minimum value shown in Table 3. That is, a first criterion value of a correlation matrix corresponding to the first l elements in the CSD sequence 1 and the CSD sequence 2 is equal to a minimum value of first criterion values corresponding to l spatial streams shown in Table 3, and a second criterion value of the correlation matrix corresponding to the first l element in the CSD sequence 1 and the CSD sequence 2 is equal to a minimum value of second criterion values corresponding to the l spatial streams shown in Table 3. l=9, 10, . . . , 16. In other words, the CSD sequence 1 and the CSD sequence 2 provided in this application can make a correlation between STFs on the spatial streams small enough.

TABLE 3

| Number of spatial streams | Minimum value of first criterion values | Minimum value of second criterion values |
|---|---|---|
| 9 | 0.1429 | 0.0564 |
| 10 | 0.1429 | 0.0571 |
| 11 | 0.1429 | 0.059 |
| 12 | 0.1429 | 0.0595 |
| 13 | 0.1429 | 0.0609 |
| 14 | 0.1429 | 0.0612 |
| 15 | 0.1429 | 0.0622 |
| 16 | 0.1429 | 0.0625 |

Figure 10:
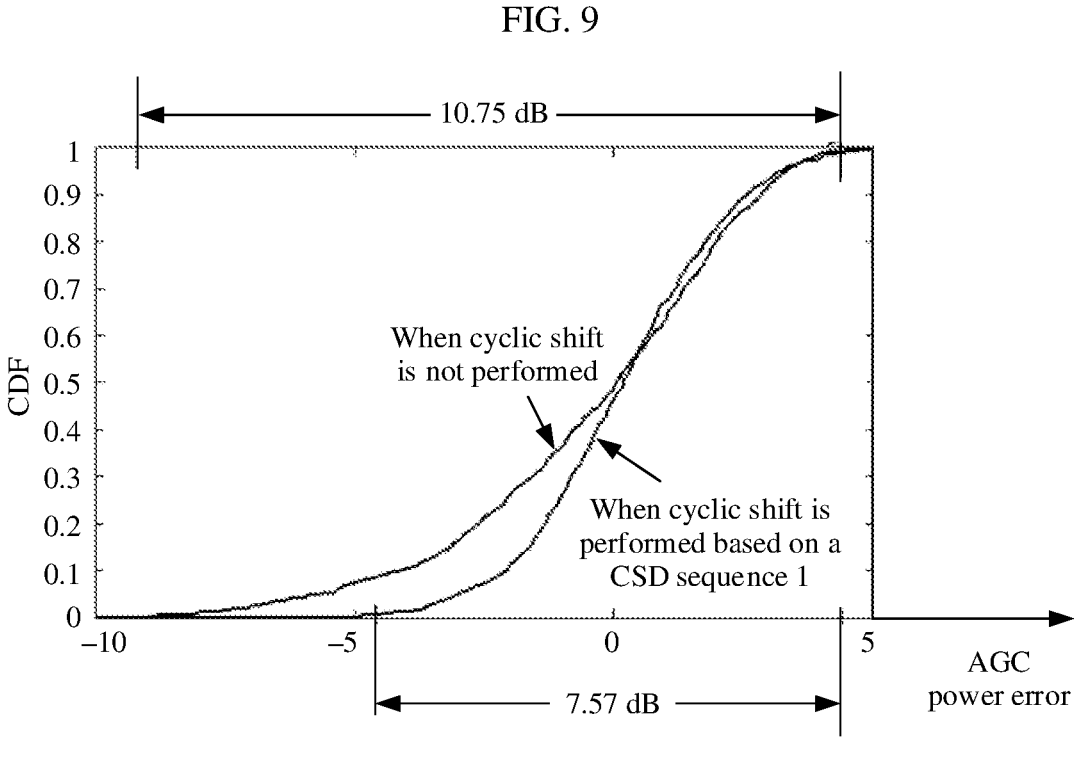
FIG. 10 is a schematic diagram of a comparison of AGC power errors according to an embodiment of this application.

In addition, FIG. 10 shows a cumulative distribution function (cumulative distribution function, CDF) curve of an AGC power error generated when cyclic shift is performed based on the CSD sequence 1 under the condition of 16 spatial streams, a 802.11n-channel model B (namely, 802.11n-Channel Model B), a 20 megahertz (megahertz, MHz) bandwidth, and 180-degree phase shift between odd and even antennas, and a CDF curve of an AGC power error generated when cyclic shift is not performed. It can be learned from FIG. 10 that, when cyclic shift is not performed, a range of the AGC power error is 10.75 dB. After cyclic shift is performed based on the CSD sequence 1, the range of the AGC power error is 7.57 dB, that is, under this condition, the range of the AGC power error can be reduced to 7.57 dB by performing cyclic shift based on the CSD sequence 1.

Figures 11A, 11B:
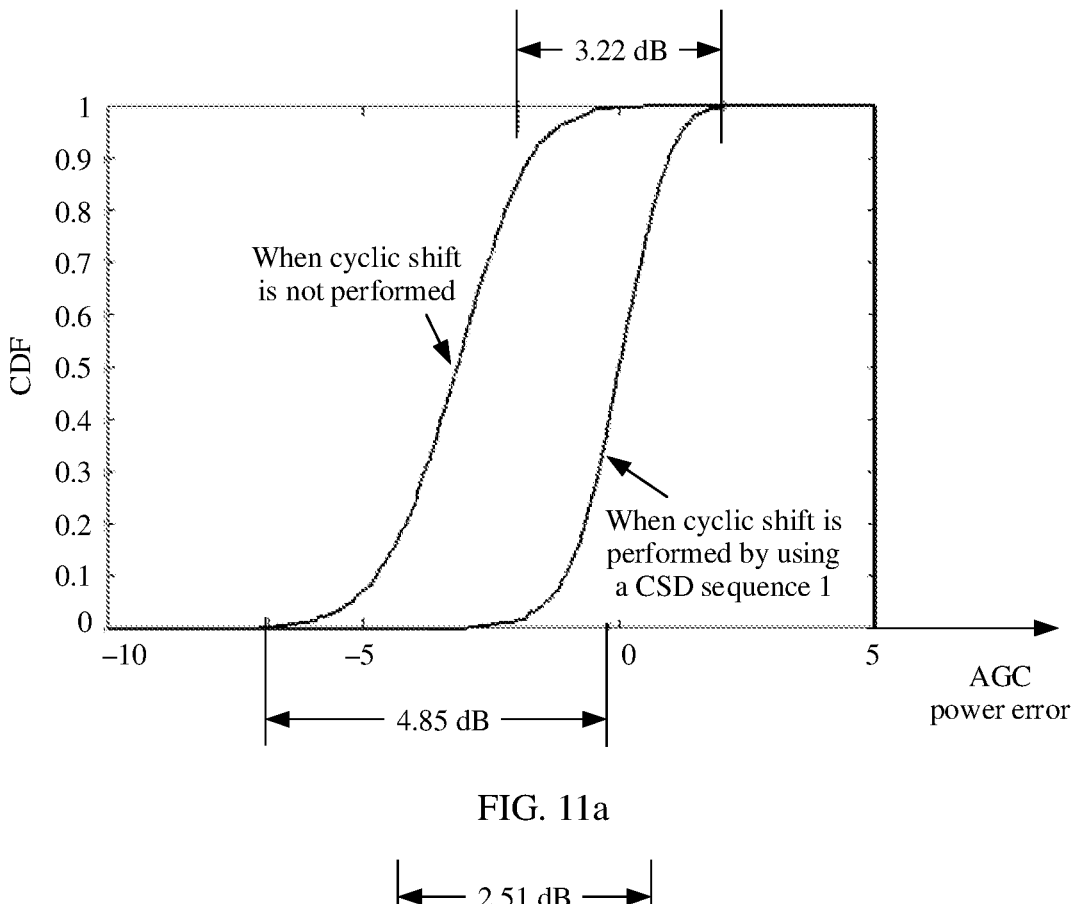
FIG. 11a is a schematic diagram of another comparison of AGC power errors according to an embodiment of this application.
FIG. 11b is a schematic diagram of still another comparison of AGC power errors according to an embodiment of this application.

FIG. 11a shows a CDF curve of an AGC power error generated when cyclic shift is performed based on the CSD sequence 1 under the condition of 16 spatial streams, a 802.11n-channel model D (namely, 802.11n-Channel Model D), a 20 MHz bandwidth, and 0-degree phase shift between odd and even antennas, and a CDF curve of an AGC power error generated when cyclic shift is not performed. It can be learned from FIG. 11a that, when cyclic shift is not performed, a range of the AGC power error is 4.85 dB. After cyclic shift is performed based on the CSD sequence 1, the range of the AGC power error is 3.22 dB, that is, under this condition, the range of the AGC power error can be reduced to 3.22 dB by performing cyclic shift based on the CSD sequence 1.

FIG. 11b shows a CDF curve of an AGC power error generated when cyclic shift is performed based on the CSD sequence 1 under the condition of 16 spatial streams, a 802.11n-channel model D (namely, 802.11n-Channel Model B), an 80 MHz bandwidth, and 0-degree phase shift between odd and even antennas, and a CDF curve of an AGC power error generated when cyclic shift is not performed. It can be learned from FIG. 11b that, when cyclic shift is not performed, a range of the AGC power error is 3.75 dB. After cyclic shift is performed based on the CSD sequence 1, the range of the AGC power error is 2.51 dB, that is, under this condition, the range of the AGC power error can be reduced to 2.51 dB by performing cyclic shift based on the CSD sequence 1.

The foregoing describes a first-type CSD sequence provided in this application, and the following describes a second-type CSD sequence provided in this application.

The second-type CSD sequence is incompatible with a CSD sequence of the second communication protocol. For example, when L is equal to 16, the first element in the CSD sequence is 0, and the last 15 elements include −550, −225, −675, −325, −100, −450, −275, −500, −50, −725, −600, −375, −150, −575, and −475. It should be noted that an order of the last 15 elements in the CSD sequence is not unique.

Optionally, a method for determining the second-type CSD sequence is similar to the method shown in FIG. 9, and a difference lies in that the second initial set is [0]. In other words, all other elements other than the first element in the CSD sequence are re-determined according to the method shown in FIG. 9. For details, refer to related descriptions shown in FIG. 9. Details are not described herein again.

According to this solution, this application provides a CSD sequence that is incompatible with the 802.11ac protocol or the 802.11ax protocol. First criterion values of a correlation matrix respectively corresponding to the first P (P=2, 3, ..., 7) elements in the CSD sequence are obtained through calculation, and are less than first criterion values of a correlation matrix respectively corresponding to the first P elements in the CSD sequence in the 802.11ac protocol or the 802.11ax protocol. Similarly, second criterion values of the correlation matrix respectively corresponding to the first P elements in the CSD sequence are less than second criterion values of the correlation matrix respectively corresponding to the first P elements in the CSD sequence in the 802.11ac protocol or the 802.11ax protocol. In other words, when there are two to seven spatial streams, the CSD sequence that is provided in this application and that is incompatible with the 802.11ac protocol or the 802.11ax protocol can further reduce a correlation between STFs on the spatial streams.

In embodiments of this application, unless otherwise stated or there is a logic conflict, terms and/or descriptions in different embodiments are consistent and may be mutually referenced, and technical features in different embodiments may be combined based on an internal logical relationship thereof, to form a new embodiment.

It may be understood that, in the foregoing embodiments, the methods and/or steps implemented by the first communication apparatus may also be implemented by a component (for example, a chip or a circuit) that can be used in the first communication apparatus, and the methods and/or steps implemented by the second communication apparatus may also be implemented by a component (for example, a chip or a circuit) that can be used in the second communication apparatus.

The foregoing mainly describes the solutions provided in this application from a perspective of interaction between devices. Correspondingly, this application further provides a communication apparatus, and the communication apparatus is configured to implement the foregoing methods. The communication apparatus may be the first communication apparatus in the foregoing method embodiments, or an apparatus including the first communication apparatus, or a component that can be used in the first communication apparatus. Alternatively, the communication apparatus may be the second communication apparatus in the foregoing method embodiments, or an apparatus including the second communication apparatus, or a component that can be used in the second communication apparatus.

It may be understood that, to implement the foregoing functions, the communication apparatus includes a hardware structure and/or a software module for performing a corresponding function. A person skilled in the art should be easily aware that, with reference to units and algorithm steps in the examples described in embodiments disclosed in this specification, this application can be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the communication apparatus may be divided into functional modules based on the foregoing method embodiments. For example, each functional module may be obtained through division based on each corresponding function, or two or more functions may be integrated into one processing module. The integrated module may be implemented in a form of hardware, or may be implemented in a form of a software functional module. It should be noted that, in embodiments of this application, module division is an example, and is merely a logical function division. In actual implementation, another division manner may be used.

Figure 12:
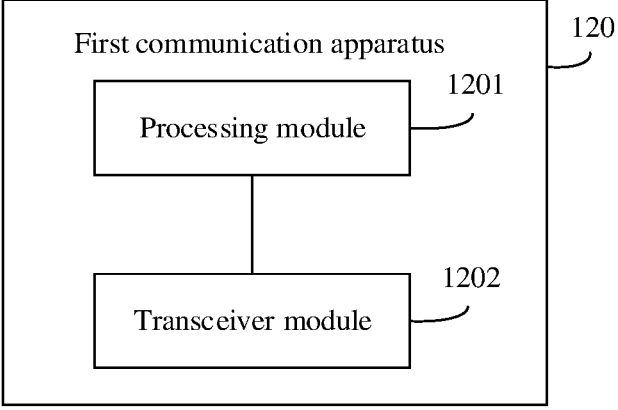
FIG. 12 is a schematic diagram of a structure of a first communication apparatus according to an embodiment of this application.

For example, the communication apparatus is the first communication apparatus in the foregoing method embodiments. FIG. 12 is a schematic diagram of a structure of a first communication apparatus 120. The first communication apparatus 120 includes a processing module 1201 and a transceiver module 1202.

Optionally, the first communication apparatus 120 may further include a storage module (not shown in FIG. 12), configured to store program instructions and data.

Optionally, the transceiver module 1202 may also be referred to as a transceiver unit, and is configured to implement a sending function and/or a receiving function. The transceiver module 1202 may include a transceiver circuit, a transceiver machine, a transceiver, or a communication interface.

For example, the first communication apparatus 120 may be the first communication apparatus, or may be a chip applied to the first communication apparatus, or another combined component or component that has a function of the first communication apparatus. When the first communication apparatus 120 is the first communication apparatus, the transceiver module 1202 may be a transceiver that may include an antenna, a radio frequency circuit, and the like, and the processing module 1201 may be a processor (or a processing circuit), for example, a baseband processor that may include one or more CPUs. When the first communication apparatus 120 is the component that has the function of the first communication apparatus, the transceiver module 1202 may be a radio frequency unit, and the processing module 1201 may be a processor (or a processing circuit), for example, a baseband processor. When the first communication apparatus 120 is a chip system, the transceiver module 1202 may be an input/output interface of a chip, and the processing module 1201 may be a processor (or a processing circuit) of the chip system, and may include one or more central processing units.

For example, the transceiver module 1202 may include a receiving module and a sending module that are configured to respectively perform receiving and sending steps performed by the first communication apparatus in the foregoing method embodiments, and/or perform other processes for supporting the technology described in this application. The processing module 1201 may be configured to perform processing steps (for example, determining and obtaining) performed by the first communication apparatus in the foregoing method embodiments, and/or perform other processes for supporting the technology described in this application.

Specifically, the processing module 1201 is configured to generate a physical layer protocol data unit PPDU. The PPDU includes a short training field STF, a long training field LTF, and a data field. The STF, the LTF, and the data field are determined based on a cyclic shift diversity CSD sequence. The CSD sequence includes L elements. L is a maximum number of spatial streams supported by the first communication apparatus. The maximum number of spatial streams is greater than or equal to 16. The transceiver module 1202 is configured to send the PPDU to a second communication apparatus.

Optionally, that the transceiver module 1202 is configured to send the PPDU to the second communication apparatus includes: The transceiver module 1202 is configured to send the PPDU to the second communication apparatus by using K spatial streams. K is a positive integer less than or equal to L.

All related content of the steps in the foregoing method embodiments may be cited in function descriptions of the corresponding functional modules. Details are not described herein again.

In this embodiment, the first communication apparatus 120 is presented in a form of functional modules obtained through division in an integrated manner. The module herein may be an ASIC, a circuit, a processor that executes one or more software or firmware programs, a memory, an integrated logic circuit, and/or another component capable of providing the foregoing functions. In a simple embodiment, a person skilled in the art may figure out that the first communication apparatus 120 may be in a form of the communication apparatus 700 shown in FIG. 7.

For example, a processor 701 in the first communication apparatus 700 shown in FIG. 7 may invoke computer-executable instructions stored in a memory 703, so that the communication apparatus 700 performs the cyclic shift sequence-based communication method in the foregoing method embodiments.

Specifically, functions/implementation processes of the processing module 1201 and the transceiver module 1202 in FIG. 12 may be implemented by the processor 701 in the communication apparatus 700 shown in FIG. 7 by invoking the computer-executable instructions stored in the memory 703. Alternatively, functions/implementation processes of the processing module 1201 in FIG. 12 may be implemented by the processor 701 in the communication apparatus 700 shown in FIG. 7 by invoking the computer-executable instructions stored in the memory 703, and functions/implementation processes of the transceiver module 1202 in FIG. 12 may be implemented through a communication interface 704 in the communication apparatus 700 shown in FIG. 7.

The first communication apparatus 120 provided in this embodiment can perform the foregoing cyclic shift sequence-based communication method. Therefore, for technical effect that can be achieved by the first communication apparatus 120, refer to the foregoing method embodiments. Details are not described herein again.

Figure 13:
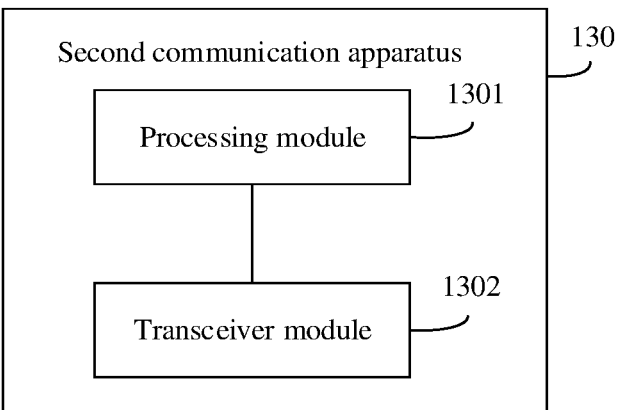
FIG. 13 is a schematic diagram of a structure of a second communication apparatus according to an embodiment of this application.

For example, the communication apparatus is the second communication apparatus in the foregoing method embodiments. FIG. 13 is a schematic diagram of a structure of a second communication apparatus 130. The second communication apparatus 130 includes a processing module 1301 and a transceiver module 1302.

Optionally, the second communication apparatus 130 may further include a storage module (not shown in FIG. 13), configured to store program instructions and data.

Optionally, the transceiver module 1302 may also be referred to as a transceiver unit, and is configured to implement a sending function and/or a receiving function. The transceiver module 1302 may include a transceiver circuit, a transceiver machine, a transceiver, or a communication interface.

For example, the second communication apparatus 130 may be the second communication apparatus, or may be a chip applied to the second communication apparatus, or another combined component or component that has a function of the second communication apparatus. When the second communication apparatus 130 is the second communication apparatus, the transceiver module 1302 may be a transceiver that may include an antenna, a radio frequency circuit, and the like, and the processing module 1301 may be a processor (or a processing circuit), for example, a baseband processor that may include one or more CPUs. When the second communication apparatus 130 is the component that has the function of the second communication apparatus, the transceiver module 1302 may be a radio frequency unit, and the processing module 1301 may be a processor (or a processing circuit), for example, a baseband processor. When the second communication apparatus 130 is a chip system, the transceiver module 1302 may be an input/output interface of a chip, and the processing module 1301 may be a processor (or a processing circuit) of the chip system, and may include one or more central processing units.

For example, the transceiver module 1302 may include a receiving module and a sending module that are configured to respectively perform receiving and sending steps performed by the second communication apparatus in the foregoing method embodiments, and/or perform other processes for supporting the technology described in this application. The processing module 1301 may be configured to perform processing steps (for example, determining and obtaining) performed by the second communication apparatus in the foregoing method embodiments, and/or perform other processes for supporting the technology described in this application.

Specifically, the transceiver module 1302 is configured to receive a physical layer protocol data unit PPDU from a first communication apparatus. The PPDU includes a short training field STF, a long training field LTF, and a data field. The STF, the LTF, and the data field are determined based on a cyclic shift diversity CSD sequence. The CSD sequence includes L elements. L is a maximum number of spatial streams supported by the first communication apparatus. The maximum number of spatial streams is greater than or equal to 16. The processing module 1301 is configured to perform processing based on the PPDU.

Optionally, that the transceiver module 1302 is configured to receive the PPDU from the first communication apparatus includes: The transceiver module 1302 is configured to receive the PPDU from the first communication apparatus by using K spatial streams.

All related content of the steps in the foregoing method embodiments may be cited in function descriptions of the corresponding functional modules. Details are not described herein again.

In this embodiment, the second communication apparatus 130 is presented in a form of functional modules obtained through division in an integrated manner. The module herein may be an ASIC, a circuit, a processor that executes one or more software or firmware programs, a memory, an integrated logic circuit, and/or another component capable of providing the foregoing functions. In a simple embodiment, a person skilled in the art may figure out that the second communication apparatus 130 may be in a form of the communication apparatus 700 shown in FIG. 7.

For example, a processor 701 in the second communication apparatus 700 shown in FIG. 7 may invoke the computer-executable instructions stored in a memory 703, so that the communication apparatus 700 performs the cyclic shift sequence-based communication method in the foregoing method embodiments.

Specifically, functions/implementation processes of the processing module 1301 and the transceiver module 1302 in FIG. 13 may be implemented by the processor 701 in the communication apparatus 700 shown in FIG. 7 by invoking the computer-executable instructions stored in the memory 703. Alternatively, functions/implementation processes of the processing module 1301 in FIG. 13 may be implemented by the processor 701 in the communication apparatus 700 shown in FIG. 7 by invoking the computer-executable instructions stored in the memory 703, and functions/implementation processes of the transceiver module 1302 in FIG. 13 may be implemented through a communication interface 704 in the communication apparatus 700 shown in FIG. 7.

The second communication apparatus 130 provided in this embodiment can perform the foregoing cyclic shift sequence-based communication method. Therefore, for technical effect that can be achieved by the second communication apparatus 130, refer to the foregoing method embodiments. Details are not described herein again.

Optionally, an embodiment of this application further provides a communication apparatus. The communication apparatus includes a processor, configured to implement the method in any one of the foregoing method embodiments. In a possible design, the communication apparatus further includes a memory. The memory is configured to store necessary program instructions and necessary data. The processor may invoke program code stored in the memory, to indicate the communication apparatus to perform the method in any one of the foregoing method embodiments. Certainly, the communication apparatus may not include a memory. In another possible design, the communication apparatus further includes an interface circuit. The interface circuit is a code/data read/write interface circuit, and the interface circuit is configured to receive computer-executable instructions (where the computer-executable instructions are stored in a memory, and may be directly read from the memory, or may be read via another component) and transmit the computer-executable instructions to the processor. In still another possible design, the communication apparatus further includes a communication interface, and the communication interface is configured to communicate with a module except for the communication apparatus. The communication apparatus may be a chip or a chip system. When the communication apparatus is a chip system, the communication apparatus may include a chip, or may include a chip and another discrete component. This is not specifically limited in this embodiment of this application.

Optionally, an embodiment of this application further provides a communication apparatus (for example, the communication apparatus may be a chip or a chip system). The communication apparatus includes an interface circuit and a logic circuit. The interface circuit is configured to obtain input information and/or output output information. The logic circuit is configured to perform the method in any one of the foregoing method embodiments, perform processing based on input information, and/or generate the output information.

When the communication apparatus is configured to implement functions of the first communication apparatus in the foregoing method embodiments, the output information may be a PPDU generated by the first communication apparatus. When the communication apparatus is configured to implement functions of the second communication apparatus in the foregoing method embodiments, the input information may be the PPDU generated by the first communication apparatus.

The communication apparatus provided in this embodiment can perform the foregoing communication method. Therefore, for technical effect that can be achieved by the communication apparatus, refer to the foregoing method embodiments. Details are not described herein again.

The foregoing descriptions about implementations allow a person skilled in the art to understand that, for the purpose of convenient and brief description, division into the foregoing functional modules is used as an example for illustration. In an actual application, the foregoing functions may be allocated to different functional modules and implemented based on a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiments are merely examples. For example, the division into modules or units is merely logical function division and may be other division during actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may be one or more physical units, may be located in one place, or may be distributed on different places. Some or all of the units may be selected based on actual requirements to achieve the objective of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

All or some of the foregoing embodiments may be implemented by using software, hardware, firmware, or any combination thereof. When a software program is used to implement embodiments, all or some of embodiments may be implemented in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk drive, or a magnetic tape), an optical medium (for example, a DVD), a semiconductor medium (for example, a solid state disk (solid state disk, SSD)), or the like. In embodiments of this application, the computer may include the apparatus described above.

Although this application is described with reference to embodiments, in a process of implementing this application that claims protection, a person skilled in the art may understand and implement another variation of the disclosed embodiments by viewing the accompanying drawings, disclosed content, and appended claims. In the claims, "comprising" (comprising) does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce better effect.

Although this application is described with reference to specific features and embodiments thereof, it is clear that various modifications and combinations may be made to them without departing from the spirit and scope of this application. Correspondingly, the specification and accompanying drawings are merely example descriptions of this application defined by the appended claims, and are considered as any of or all modifications, variations, combinations, or equivalents that cover the scope of this application. It is clearly that a person skilled in the art can make various modifications and variations to this application without departing from the spirit and scope of this application. This application is intended to cover these modifications and variations of this application provided that they fall within the scope of the claims of this application and equivalent technologies thereof.

What is claimed is:

1. A cyclic shift diversity sequence-based communication method comprising:

generating, by a first communication apparatus, a physical layer protocol data unit (PPDU), wherein the PPDU comprises a non-legacy short training field (STF), a non-legacy long training field (LTF), and a data field; the STF, the LTF, and the data field are determined based on a cyclic shift diversity (CSD) sequence; the CSD sequence comprises L elements; L is a maximum number of spatial streams supported by the first communication apparatus; and the maximum number of spatial streams is greater than or equal to 16; and sending, by the first communication apparatus, the PPDU to a second communication apparatus, wherein:

the first eight elements in the CSD sequence are 0, −400, −200, −600, −350, −650, −100, and −750; and the last eight elements in the CSD sequence comprise −550, −250, −500, −150, −700, −50, −450, and −300; or the first element in the CSD sequence is 0; and the last 15 elements in the CSD sequence comprise −550, −225, −675, −325, −100, −450, −275, −500, −50, −725, −600, −375, −150, −575, and −475.

2. The method according to claim 1, wherein the sending, by the first communication apparatus, the PPDU to the second communication apparatus comprises:

sending, by the first communication apparatus, the PPDU to the second communication apparatus by using K spatial streams, wherein K is a positive integer less than or equal to L.

3. The method according to claim 2, wherein the STF, the LTF, and the data field are determined based on the first K elements in the CSD sequence.

4. The method according to claim 1, wherein L is equal to 16; the first eight elements in the CSD sequence are 0, −400, −200, −600, −350, −650, −100, and −750; and the last eight elements in the CSD sequence comprise −550, −250, −500, −150, −700, −50, −450, and −300.

5. The method according to claim 1, wherein L is equal to 16; the first element in the CSD sequence is 0; and the last 15 elements in the CSD sequence comprise −550, −225, −675, −325, −100, −450, −275, −500, −50, −725, −600, −375, −150, −575, and −475.

6. A cyclic shift diversity sequence-based communication method, comprising:

receiving, by a second communication apparatus, a physical layer protocol data unit (PPDU) from a first communication apparatus, wherein the PPDU comprises a non-legacy short training field (STF), a non-legacy long training field (LTF), and a data field; the STF, the LTF, and the data field are determined based on a cyclic shift diversity (CSD) sequence; the CSD sequence comprises L elements; L is a maximum number of spatial streams supported by the first communication apparatus; and the maximum number of spatial streams is greater than or equal to 16; and performing, by the second communication apparatus, processing based on the PPDU, wherein:

the first eight elements in the CSD sequence are 0, −400, −200, −600, −350, −650, −100; and −750; and the last eight elements in the CSD sequence comprise −550, −250, −500, −150, −700, −50, −450, and −300; or the first element in the CSD sequence is 0; and the last 15 elements in the CSD sequence comprise −550, −225, −675, −325, −100, −450, −275, −500, −50, −725, −600, −375, −150, −575, and −475.

7. The method according to claim 6, wherein the receiving, by the second communication apparatus, the PPDU from the first communication apparatus comprises:

receiving, by the second communication apparatus, the PPDU from the first communication apparatus by using K spatial streams.

8. The method according to claim 7, wherein the STF, the LTF, and the data field are determined based on the first K elements in the CSD sequence.

9. The method according to claim 6, wherein L is equal to 16; the first eight elements in the CSD sequence are 0, −400, −200, −600, −350, −650, −100; and −750; and the last eight elements in the CSD sequence comprise −550, −250, −500, −150, −700, −50, −450, and −300.

10. The method according to claim 6, wherein L is equal to 16; the first element in the CSD sequence is 0; and the last 15 elements in the CSD sequence comprise −550, −225, −675, −325, −100, −450, −275, −500, −50, −725, −600, −375, −150, −575, and −475.

11. An apparatus, comprising:

a processor; and a memory, storing instructions, which when executed by the processor, cause the apparatus to perform operations comprising:

generate, a physical layer protocol data unit (PPDU), wherein the PPDU comprises a non-legacy short training field (STF), a non-legacy long training field (LTF), and a data field; the STF, the LTF, and the data field are determined based on a cyclic shift diversity (CSD) sequence; the CSD sequence comprises L elements; L is a maximum number of spatial streams supported by the first communication apparatus; and the maximum number of spatial streams is greater than or equal to 16; and send the PPDU to a second communication apparatus, wherein:

the first eight elements in the CSD sequence are 0, −400, −200, −600, −350, −650, −100, and −750; and the last eight elements in the CSD sequence comprise −550, −250, −500, −150, −700, −50, −450, and −300, or the first element in the CSD sequence is 0; and the last 15 elements in the CSD sequence comprise −550, −225, −675, −325, −100, −450, −275, −500, −50, −725, 600, −375, −150, −575, and −475.

12. The apparatus according to claim 11, wherein the instructions cause the apparatus to:

send the PPDU to the second communication apparatus by using K spatial streams, wherein K is a positive integer less than or equal to L.

13. The apparatus according to claim 12, wherein the STF, the LTF, and the data field are determined based on the first K elements in the CSD sequence.

14. The apparatus according to claim 11, wherein L is equal to 16; the first eight elements in the CSD sequence are 0, −400, −200, −600, −350, −650, −100, and −750; and the last eight elements in the CSD sequence comprise −550, −250, −500, −150, −700, −50, −450, and −300.

15. The apparatus according to claim 11, wherein Lis equal to 16; the first element in the CSD sequence is 0; and the last 15 elements in the CSD sequence comprise −550, −225, −675, −325, −100, −450, −275, −500, −50, −725, −600, −375, −150, −575, and −475.

16. An apparatus, comprising:

a processor; and a memory, storing instructions, which when executed by the processor, cause the apparatus to perform operations comprising:

receive a physical layer protocol data unit (PPDU) from a first communication apparatus, wherein the PPDU comprises a non-legacy short training field (STF), a non-legacy long training field (LTF), and a data field; the STF, the LTF, and the data field are determined based on a cyclic shift diversity (CSD) sequence; the CSD sequence comprises L elements; L is a maximum number of spatial streams supported by the first communication apparatus; and the maximum number of spatial streams is greater than or equal to 16; and perform processing based on the PPDU,
wherein:
 the first eight elements in the CSD sequence are 0, −400, −200, −600, −350, −650, −100; and −750; and the last eight elements in the CSD sequence comprise −550, −250, −500, −150, −700, −50, −450, and −300, or the first element in the CSD sequence is 0; and the last 15 elements in the CSD sequence comprise −550, −225, −675, −325, −100, −450, −275, −500, −50, −725, −600, −375, −150, −575, and −475.

17. The apparatus according to claim 16, wherein the instructions cause the apparatus to:

receive the PPDU from the first communication apparatus by using K spatial streams.

18. The apparatus according to claim 17, wherein the STF, the LTF, and the data field are determined based on the first K elements in the CSD sequence.

19. The apparatus according to claim 16, wherein L is equal to 16; the first eight elements in the CSD sequence are 0, −400, −200, −600, −350, −650, −100; and −750; and the last eight elements in the CSD sequence comprise −550, −250, −500, −150, −700, −50, −450, and −300.

20. The apparatus according to claim 16, wherein L is equal to 16; the first element in the CSD sequence is 0; and the last 15 elements in the CSD sequence comprise −550, −225, −675, −325, −100, −450, −275, −500, −50, −725, −600, −375, −150, −575, and −475.

\* \* \* \* \*